(12) United States Patent
Kim et al.

(10) Patent No.: US 11,989,375 B2
(45) Date of Patent: May 21, 2024

(54) ELECTRONIC DEVICE FOR TYPO CORRECTION AND METHOD THEREOF

(71) Applicant: SAMSUNG ELECTRONICS CO., LTD., Suwon-si (KR)

(72) Inventors: Taekyoung Kim, Suwon-si (KR);
Seoghee Jeong, Suwon-si (KR);
Sangheon Kim, Suwon-si (KR);
Yeunwook Lim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 164 days.

(21) Appl. No.: 17/835,787

(22) Filed: Jun. 8, 2022

(65) Prior Publication Data

US 2022/0308733 A1    Sep. 29, 2022

Related U.S. Application Data

(63) Continuation of application No. PCT/KR2022/003631, filed on Mar. 15, 2022.

(30) Foreign Application Priority Data

Mar. 15, 2021    (KR) .................. 10-2021-0033625

(51) Int. Cl.
*G06F 3/041*       (2006.01)
*G06F 3/04886*     (2022.01)

(52) U.S. Cl.
CPC ...... *G06F 3/04186* (2019.05); *G06F 3/04886* (2013.01)

(58) Field of Classification Search
CPC ............. G06F 3/04186; G06F 3/04886; G06F 3/04842; G06F 3/011; G06F 3/0233; G06F 3/0416; G06N 3/08
See application file for complete search history.

(56) References Cited

U.S. PATENT DOCUMENTS

2006/0290660 A1   12/2006   Kim
2010/0315266 A1   12/2010   Gunawardana et al.
(Continued)

FOREIGN PATENT DOCUMENTS

CN    104346067      2/2019
JP    2009-252076   10/2009
(Continued)

OTHER PUBLICATIONS

Search Report and Written Opinion dated Jun. 10, 2022 in counterpart International Patent Application No. PCT/KR2022/003631.

*Primary Examiner* — Brent D Castiaux
(74) *Attorney, Agent, or Firm* — Nixon & Vanderhye, P.C.

(57) ABSTRACT

An electronic device according to various embodiments includes: a display, a sensor module including a touch sensor configured to receive a touch input and generate touch data, a memory, and a processor operatively connected to the display, the sensor module, and the memory, wherein the processor is configured to: generate a first filter having a first time filter value and a first magnitude filter value, generate a second filter having a second time filter value greater than the first time filter value and a second magnitude filter value greater than the first magnitude filter value, acquire the touch data including a first point where a touch starts and a second point where the touch ends, apply the first filter based on a moving from the first point to the second point being closer to a center line that vertically bisects a keyboard, apply the second filter based on the moving being farther away from the center line, determine that a key of the keyboard corresponding to the first point has been touched based on a duration of the touch input being less than the time filter value of the filter and a distance between the first point and the second point being less than the magnitude filter value, and determine that a key of the keyboard corresponding to (Continued)

the second point has been touched based on the duration of the touch input being equal to or greater than the time filter value of the filter and the distance between the first point and the second point being equal to or greater than the magnitude filter value.

20 Claims, 13 Drawing Sheets

(56) References Cited

U.S. PATENT DOCUMENTS

| | | |
|---|---|---|
| 2011/0242032 A1 | 10/2011 | Seo et al. |
| 2013/0021260 A1 | 1/2013 | Hwang |
| 2013/0326389 A1 | 12/2013 | Kim |
| 2016/0004433 A1 | 1/2016 | Wang et al. |
| 2016/0034046 A1* | 2/2016 | Waddell ................ G06F 3/0237 345/173 |
| 2018/0081539 A1* | 3/2018 | Ghassabian ........... G06F 3/0236 |
| 2018/0232137 A1* | 8/2018 | Ma ...................... G06F 3/04886 |

FOREIGN PATENT DOCUMENTS

| | | |
|---|---|---|
| KR | 10-2011-0026231 | 3/2011 |
| KR | 10-2011-0082956 | 7/2011 |
| KR | 10-2011-0110940 | 10/2011 |
| KR | 10-2014-0019188 | 2/2014 |
| KR | 10-2015-0024435 | 3/2015 |
| KR | 10-2018-0109401 | 10/2018 |
| KR | 10-2020-0051170 | 5/2020 |

* cited by examiner

ELECTRONIC DEVICE FOR TYPO CORRECTION AND METHOD THEREOF

CROSS-REFERENCE TO RELATED APPLICATIONS

This application is a continuation of International Application No. PCT/KR2022/003631 designating the United States, filed on Mar. 15, 2022, in the Korean Intellectual Property Receiving Office and claiming priority to Korean Patent Application No. 10-2021-0033625, filed on Mar. 15, 2021, the disclosures of which are incorporated by reference herein in their entireties.

BACKGROUND

Field

The disclosure relates to an electronic device and, for example, to a method for correcting a typo caused by a slip of a user's touch on a keyboard.

Description of Related Art

In line with development of mobile communication technologies and hardware and/or software technologies, portable electronic devices (hereinafter, referred to as electronic devices) have become able to implement various functions in additional conventional communication functions. Electronic devices may provide functions for user convenience using various user interfaces (UI) displayed on displays thereof.

For example, an electronic device may provide a keyboard UI and may input a text including numbers, characters, or symbols, based on user inputs regarding the UI. The keyboard UI provided by the electronic device is not fixed in one type, and the keyboard UI may freely vary depending on the provided application and use environment.

When a user uses the keyboard UI of an electronic device, a typo may occur due to a slip, and the electronic device may have a filter for correcting the same. Conventional electronic devices operate a filter having fixed time and magnitude and thus filter both correct and erroneous keystrokes, thereby exhibiting insignificant typo correction effects.

For example, an erroneous keystroke followed by a slip to a correct keystroke may be filtered if a fixed filter criterion is satisfied, or a correct keystroke followed by a slip to an erroneous keystroke may not be filtered if the fixed filter criterion is not satisfied. As a result, accuracy of the keyboard may be degraded.

SUMMARY

Embodiments of the disclosure to provide a typo correction method wherein, when an electronic device corrects keyboard typos due to slips as described above, multiple filters having different filter values are provided such that flexible filtering is performed, and a relatively high level of accuracy is provided.

An electronic device according to various example embodiments may include: a display, a sensor module including a touch sensor configured to receive a touch input and generate touch data, a memory, and a processor operatively connected to the display, the sensor module, and the memory, wherein the processor is configured to: generate a first filter having a first time filter value and a first magnitude filter value, generate a second filter having a second time filter value greater than the first time filter value and a second magnitude filter value greater than the first magnitude filter value, acquire the touch data including a first point where the touch starts and a second point where the touch ends, apply the first filter based on a moving from the first point to the second point being closer to a center line that vertically bisects a keyboard, apply the second filter based on the moving being farther away from the center line, determine that a key of the keyboard corresponding to the first point has been touched based on a duration of the touch input being less than the time filter value of the filter and a distance between the first point and the second point being less than the magnitude filter value, and determine that a key of the keyboard corresponding to the second point has been touched based on the duration of the touch input being equal to or greater than the time filter value of the filter and the distance between the first point and the second point being equal to or greater than the magnitude filter value.

A typo correction method of an electronic device according to various example embodiments may include: generating a first filter having a first time filter value and a first magnitude filter value, generating a second filter having a second time filter value greater than the first time filter value and a second magnitude filter value greater than the first magnitude filter value, acquiring touch data including a first point where the touch starts and a second point where the touch ends, applying the first filter based on a moving from the first point to the second point being closer to a center line that vertically bisects a keyboard, applying the second filter based on the moving being farther away from the center line, determining that a key of the keyboard corresponding to the first point has been touched based on a duration of the touch input being less than the time filter value of the filter and a distance between the first point and the second point being less than the magnitude filter value, and determining that a key of the keyboard corresponding to the second point has been touched based on the duration of the touch input being equal to or greater than the time filter value of the filter and the distance between the first point and the second point being equal to or greater than the magnitude filter value.

According to various example embodiments, an electronic device may generate multiple filters having different filter values and may change the filter to apply, according to the situation. Therefore, the electronic device may make correction using a filter having a small filter value in the case of a correct keystroke followed by a slip to a correct keystroke, and may conduct filtering using a filter having a large filter value in the case of a correct keystroke followed by a slip to an erroneous keystroke.

Other advantageous effects obtainable from various example embodiments of the disclosure will be disclosed explicitly or implicitly in detailed description of embodiments of the disclosure. For example, various advantageous effects of various embodiments of the disclosure will be disclosed in the following detailed description.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1:
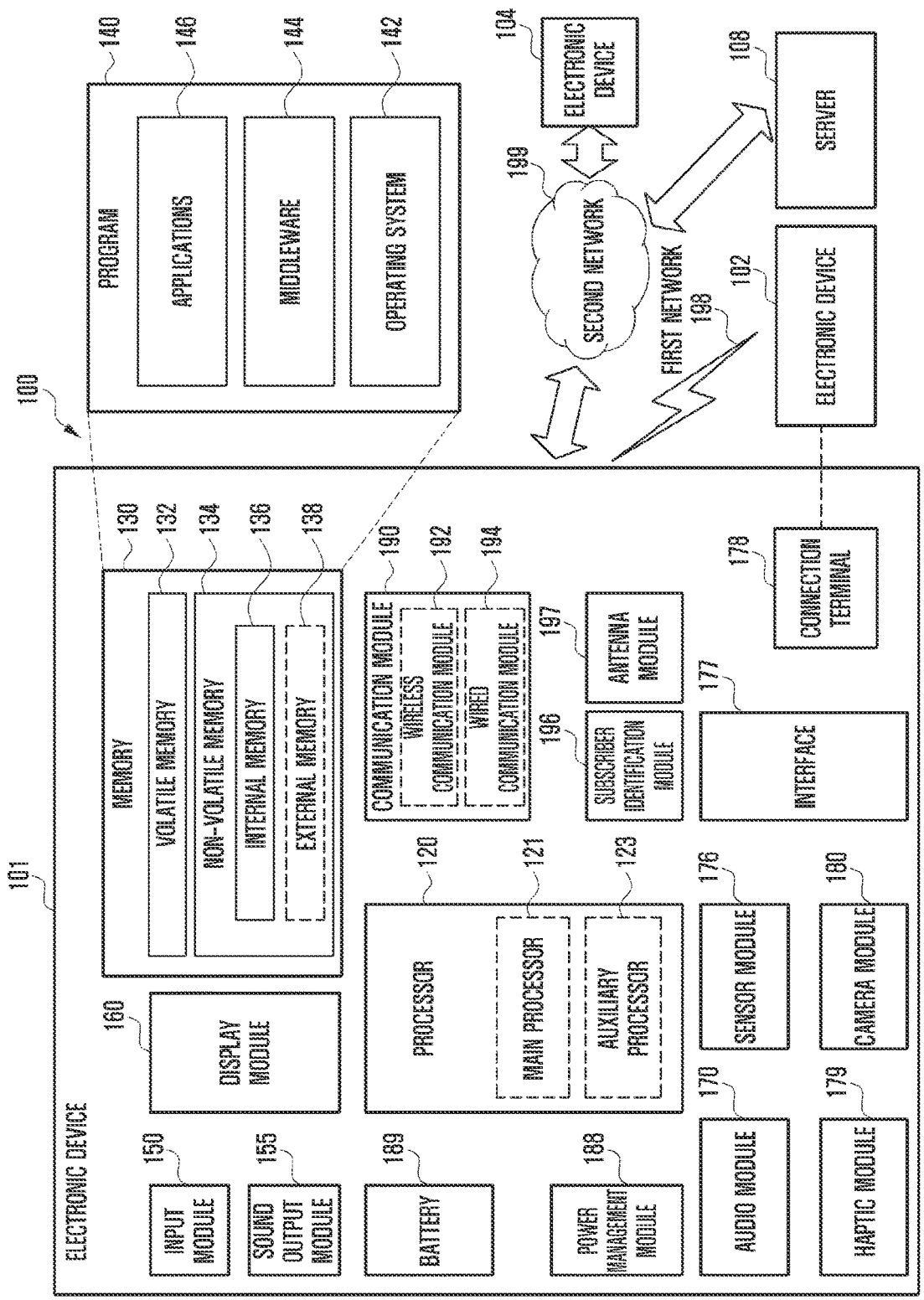
FIG. 1 is a block diagram illustrating an example electronic device in a network environment according to various embodiments.

FIG. 1 is a block diagram illustrating an example electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In various embodiments, at least one of the components (e.g., the connecting terminal 178) may be omitted from the electronic device 101, or one or more other components may be added in the electronic device 101. In various embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146. The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator. The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC). The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used in connection with various embodiments of the disclosure, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
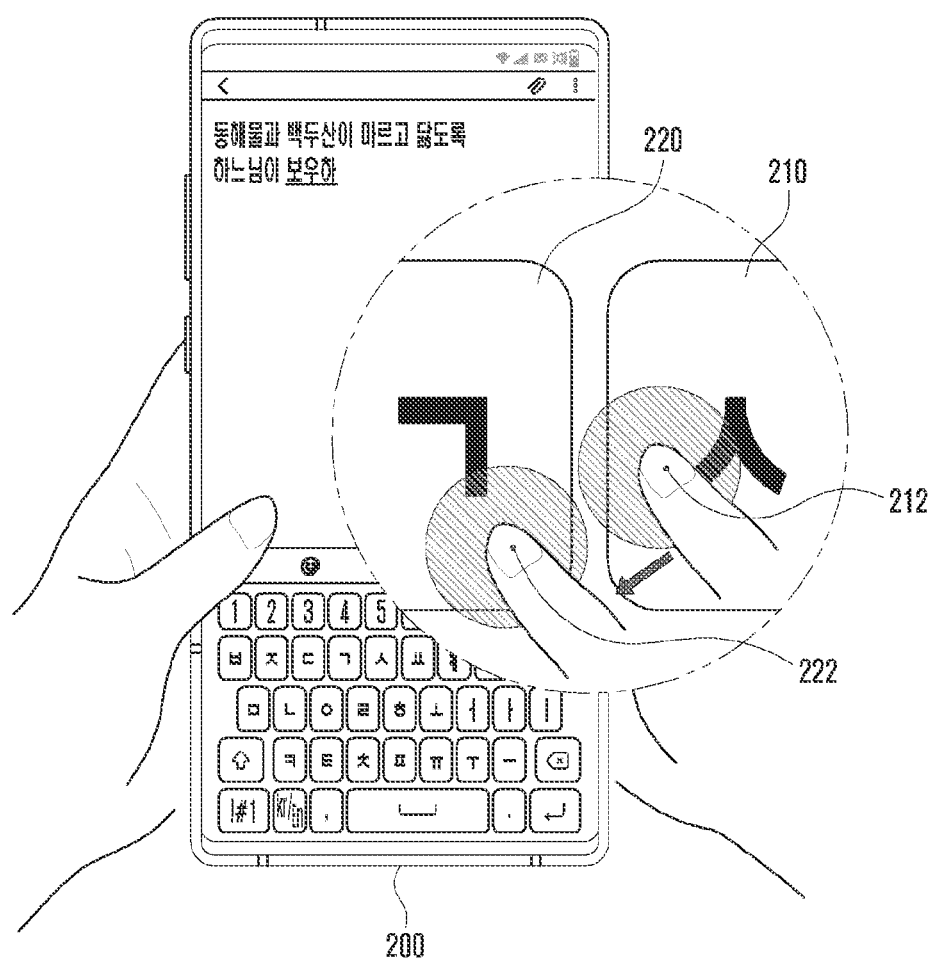
FIG. 2 is a diagram illustrating example occurrence of a typo due to a slip according to various embodiments.

FIG. 2 is a diagram illustrating an example of an occurrence of a typo due to a slip according to various embodiments.

According to various embodiments, an electronic device 200 (e.g., the electronic device 101 of FIG. 1) may execute various applications. The electronic device 200 may configure various UIs according to an application configuration. For example, the electronic device 200 may arrange a UI object capable of performing the function of an application in the upper end of a display, and may arrange a button including a keyboard in the lower end of the display.

According to various embodiments, the electronic device 200 may display characters or numbers on a display (e.g., the display module 160 of FIG. 1) based on a user input to a keyboard. The electronic device 200 may display various types of keyboards, and may display at least one of, for example, and without limitation, a qwerty keyboard, a qwerty Sym mode, a Korean keyboard, 3×4 keyboard, 3×4 Sym mode, 123 mode, or the like. The electronic device 200 may identify a user's touch point on the display, and may display, when the touched point is inside a keycap, characters or numbers corresponding to the keycap on the display.

According to various embodiments, the electronic device 200 may identify the position of a point (hereinafter, a first point 212) where a user's touch input starts and a point (hereinafter, a second point 222) where the touch input ends. For example, the user's touch may start at the first point 212 and slip to the second point 222. When the first point 212 and the second point 222 are the same, a slip may not occur. The electronic device 200 may determine that the user has touched a first keycap 210 including the first point 212 on the keyboard and may display characters or numbers corresponding to the first keycap 210 on the display. The electronic device 200 may determine that the user has touched a second keycap 220 including the second point 222 and may display characters or numbers corresponding to the second keycap 220 on the display. Accordingly, when a slip occurs, the electronic device 200 may recognize that a keycap different from the user's original intention is touched. Table 1 below summarizes the number of times that a slip occurred when typing was performed more than a certain number of times, the number of times that a typo (the term "typo" as used herein may be used interchangeably with the term "typographical error") occurred due to the slip, and the number of times that a typo was corrected due to a slip.

TABLE 1

|  | Number of times | Percentage |
| --- | --- | --- |
| Total typing | 25,095 |  |
| Number of times key was changed due to slip | 40 | 0.16% |
| Number of times typo occurred due to slip | 18 | 0.07% |
| Number of times typo was corrected due to slip | 22 | 0.09% |

Referring to Table 1, in a total of 25,095 touches, 40 slips occurred, of which 18 typos occurred due to the slips, and the number of times that the typo was corrected due to the slip was 22 times. According to various embodiments, the electronic device 200 may filter a slip that generates a typo and may not filter a slip that corrects a typo. Therefore, in Table 1 above, for No. 18, it is determined that the keyboard corresponding to a first touched point is selected by filtering the slip, and for No. 22, it is determined that the keyboard corresponding to the last touched point is selected because the slip is not filtered. Table 2 below shows a pattern in which a slip occurs for each touch coordinate when a given phrase (e.g., Korean phrase "동해물과 백두산이 마르고 닳도록 하느님이 보우하사 우리나라 만세 무궁화 삼천리 화려강산 대한사람 대한으로 길이 보전하세!") is repeatedly input.

TABLE 2

|  | 1 Column | 2 Column | 3 Column | 4 Column | 5 Column | 6 Column | 7 Column | 8 Column | 9 Column | 10 Column |
| --- | --- | --- | --- | --- | --- | --- | --- | --- | --- | --- |
| 1 Row | →(60%) ↘(36%) Total 25 times | ↓(41%) ↘(33%) Total 12 times | ↓(39%) ↘(28%) Total 46 times | ↓(35%) ←(30%) total 62 times | ←(38%) ↙(29%) Total 55 times | 0 times | →(100%) ↑(0%) Total 1 time | 0 times | ↙(85%) ←(14%) Total 7 times | ←(71%) ↙(28%) Total 7 times |
| 2 Row | →(67%) ↘(23%) Total 76 times | →(47%) ↘(19%) Total 86 times | →(47%) ↘(11%) Total 67 times | ←(33%) ↓(12%) Total 63 times | ←(47%) ↙(16%) Total 72 times | ←(58%) ↙(14%) Total 55 times | →(47%) ↙(19%) Total 21 times | ↙(42%) ↓(23%) Total 21 times | ←(50%) ↙(33%) Total 18 times | ←(50%) ↙(35%) Total 14 times |

TABLE 2-continued

| | 1 Column | 2 Column | 3 Column | 4 Column | 5 Column | 6 Column | 7 Column | 8 Column | 9 Column | 10 Column |
|---|---|---|---|---|---|---|---|---|---|---|
| 3 Row | 0 times | 0 times | ↑(100%) ↗(0%) Total 1 time | ↑(71%) ↗(14%) Total 7 times | ←(70%) ↑(20%) Total 10 times | 0 times | ↑(44%) →(44%) Total 9 times | ↑(50%) →(25%) Total 4 times | ↙(100%) ↑(0%) Total 1 time | ←(50%) ↑(25%) Total 4 times |
| 4 Row | 0 times | 0 times | 0 times | 0 times | ↑(50%) ←(50%) Total 2 times | ↑(30%) ↗(23%) Total 13 times | ↑(54%) →(11%) Total 81 times | ↑(57%) ↖(28%) Total 7 times | ↑(25%) →(25%) Total 4 times | 0 times |

The numbers and directions input in Table 2 are the most slip angle, the second most slip angle, and the total number of slips with respect to the slips occurring on the keyboard. For example, a total of 25 slips occurred on the keyboard in row 1 and column 1 (e.g., the "ㅂ" key of the keyboard), the slip in the 3 o'clock direction occurred the most at 60% of the 25 slips, and the slip in the 5 o'clock direction occurred the second most at 36% thereof. Therefore, it can be seen that, on the keyboard of 1 row and 1 column located at the top of the most left side of the keyboard, a lot of slips occurred generally to the right and down. The electronic device 200 may collect data on the slips occurring on the keyboard and may store the collected data in a memory (e.g., the memory 130 of FIG. 1).

According to various embodiments, the user tends to touch the keyboard on the left with the left hand and the keyboard on the right with the right hand with respect to the center line of the keyboard. According to an embodiment, with respect to a touch occurring in the central portion of the keyboard, a slip to the left may be more likely to occur when a touch occurs with the left hand, and a slip to the right may be more likely to occur when a touch occurs with the right hand.

For example, when the keyboard is in the form of a Hangul keyboard, the "ㄱ" key of the keyboard and the "ㅅ" key of the keyboard may be located adjacent to each other. The user may touch the first point 212 in the "ㅅ" key of the keyboard with the intention of pressing the "ㅅ" key of the keyboard, but a slip may occur and the touch may be terminated at the second point 222 in the "ㄱ" key of the keyboard. In this case, the electronic device 200 may recognize that the user has touched the second point 222 instead of the first point 212.

According to various embodiments, the electronic device 200 may filter the slip in order to prevent and/or reduce typos due to the slip. For example, even if the touch ends at the second point 222, it may be determined that the first point 212 has been touched. For example, in the above example, the electronic device 200 may filter the slip even if the touch on the "ㄱ" key of the keyboard ends, and may recognize that the "ㅅ" key of the keyboard has been touched.

Figure 3:
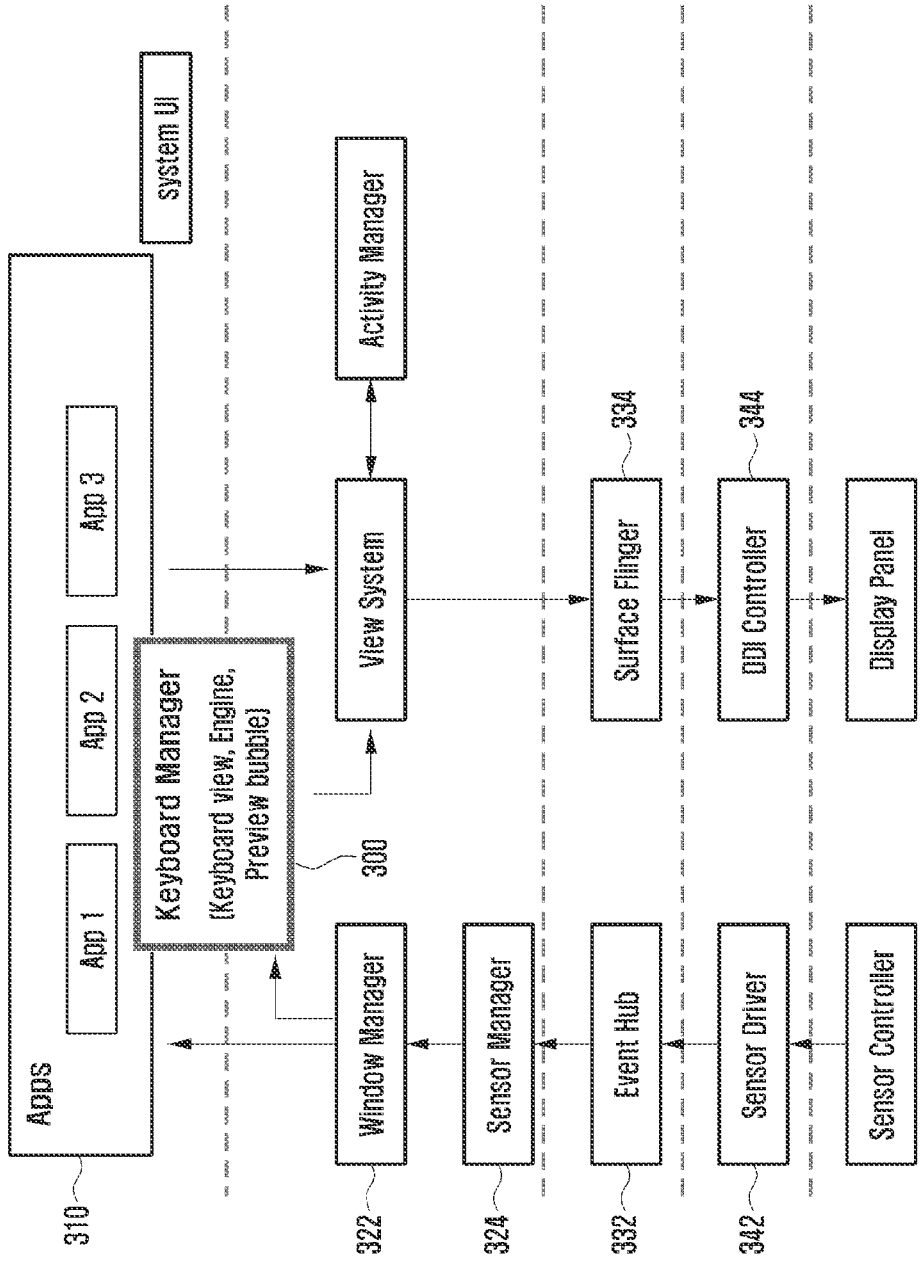
FIG. 3 is a diagram illustrating an example module configuration of an electronic device according to various embodiments.

FIG. 3 is a block diagram illustrating an example module configuration of an electronic device according to various embodiments.

According to various embodiments, the electronic device (e.g., the electronic device 101 of FIG. 1 or the electronic device 200 of FIG. 2) may include various software modules. Referring to FIG. 3, the electronic device may include at least one of a keyboard manager 300, an application 310, a window manager 322, a sensor manager 324, an event hub 332, a surface flinger 334, a sensor driver 342, and a display driver IC controller 344. Each of the modules may include various processing circuitry and/or executable program instructions.

According to various embodiments, the keyboard manager 300 may determine whether a slip occurs inside and outside a keycap or at the center of the keyboard. According to an embodiment, the keyboard manager 300 may determine to apply one of a first filter and a second filter to prevent and/or reduce typos.

According to various embodiments, the application 310 may draw at least one layer based on the resolution of the display. For example, the application 310 may use a corresponding view to draw at least one layer based on the resolution of the display.

According to various embodiments, when a change in the state of the electronic device is identified, the window manager 322 may transmit display information of the display corresponding to the changed state of the electronic device to the application 310. For example, when the change in the state of the electronic device is identified, the display information corresponding to the changed state of the electronic device may be transmitted to the application 310 affected by the change in the state.

According to various embodiments, the sensor manager 324 may control a sensor based on the configuration of the application 310. For example, when a user's touch input to the keyboard occurs, the sensor manager 324 may control a touch sensor to instruct to generate touch data.

According to various embodiments, the event hub 332 may be an interface module that standardizes an event occurring in a sensor module (e.g., the sensor module 176 of FIG. 1). According to an embodiment, the event hub 332 may be included in a hardware abstraction layer (HAL) between a plurality of hardware modules included in a hardware layer and software of the electronic device.

According to various embodiments, the surface flinger 334 may be located in the HAL, and may synthesize a plurality of layers. For example, the surface flinger 334 may provide data representing the plurality of synthesized layers to the display controller 344.

According to various embodiments, the sensor driver 342 may operate in the kernel layer and may be an interface module that controls the sensor controller. The sensor driver 342 may connect an operating system and a sensor, and may include information on a driving method, characteristic, and/or function of the sensor. The sensor driver 342 may include an interface module for controlling the sensor controller connected to the sensor.

According to various embodiments, the display controller 344 may receive data indicating the plurality of synthesized layers from the surface flinger 334 and may correspond to a display driving circuit. For example, components of a processor (e.g., the processor 120 of FIG. 1) may be implemented in a hardware or software manner.

Figure 4:
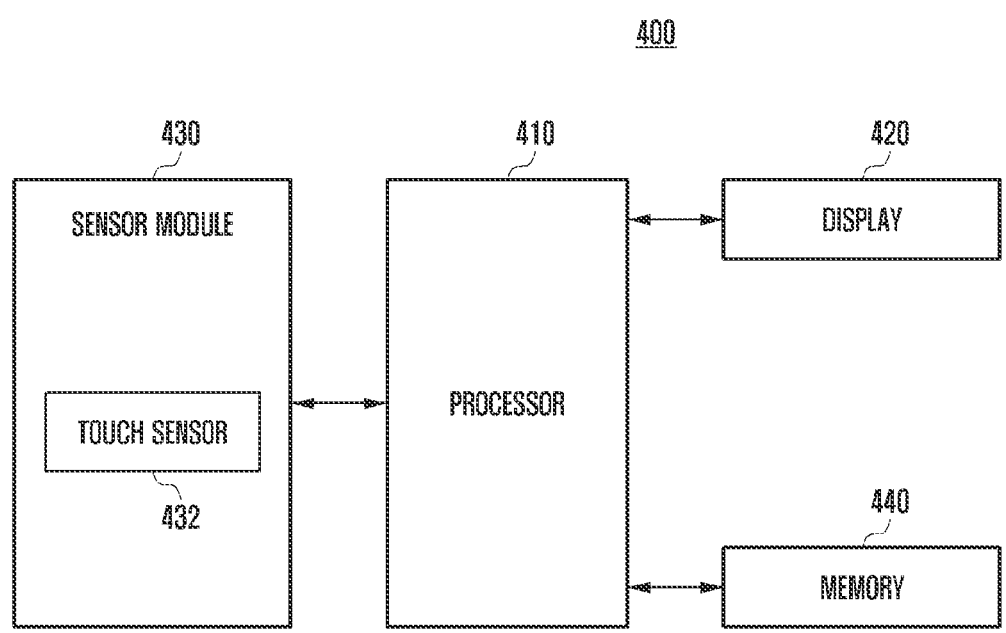
FIG. 4 is a block diagram illustrating an example configuration of an electronic device according to various embodiments.

FIG. 4 is a block diagram illustrating an example configuration of an electronic device according to various embodiments.

Referring to FIG. 4, an electronic device 400 may include a display 420, a sensor module (e.g., including at least one sensor) 430, a processor (e.g., including processing circuitry) 410, and/or a memory 440. In various embodiments, some of the illustrated components may be omitted or substituted. The electronic device 400 may further include at least some of the components and/or functions of the electronic device 101 of FIG. 1. At least some of the illustrated (or not illustrated) respective components of the electronic device 400 may be operatively, functionally, and/or electrically connected to each other.

According to various embodiments, the display 420 may display various images under the control of the processor 410. The display 420 may be implemented as one of, for example, and without limitation, a liquid crystal display (LCD), a light-emitting diode (LED) display, a micro LED display, a quantum dot (QD) display, an organic light-emitting diode (OLED) display, or the like, but is not limited thereto. The display 420 may be formed of a touch screen that senses a touch and/or proximity touch (or hovering) input using a user's body part (e.g., a finger) or an input device (e.g., a stylus pen). The display 420 may include at least some of the components and/or functions of the display module 160 of FIG. 1.

According to various embodiments, at least a portion of the display 420 may be flexible, and may be implemented as, for example, and without limitation, a foldable display, a rollable display, a slidable display, a stretchable display, or the like.

According to various embodiments, the touch sensor 432 may include at least some of the components and/or functions of the sensor module 176 of FIG. 1, and may receive a user input for the display 420. The touch sensor 432 may be implemented as, for example, and without limitation, at least one of a conductivity sensor, a capacitive touch sensor, a resistive touch sensor, a surface touch sensor, and a projected captivated (PCAP) touch sensor, a surface acoustic wave touch sensor, or the like, but is not limited thereto. The display 420 of the electronic device 400 may include one or more touch sensors 432.

According to various embodiments, the memory 440 may include a volatile memory (e.g., the volatile memory 132 of FIG. 1) and a nonvolatile memory (e.g., the nonvolatile memory 134 of FIG. 1) to temporarily or permanently store various types of data. The memory 440 may include at least some of the components and/or functions of the memory 130 of FIG. 1, and may store the program 140 of FIG. 1.

According to various embodiments, the memory 440 may store various instructions that may be executed by the processor 410. Such instructions may include control commands such as arithmetic and logical operations, data movement, or input/output, which may be recognized by the processor 410.

According to various embodiments, the processor 410 may be a component that is operatively, functionally, and/or electrically with the respective components (e.g., the display 420, the sensor module 430, and the memory 440) of the electronic device 400 to perform operations or data processing related to control and/or communication of the respective components. The processor 410 may include at least some of the components and/or functions of the processor 120 of FIG. 1.

According to various embodiments, there will be no limitations to the arithmetic and data processing functions that the processor 410 can implement on the electronic device 400. However, hereinafter, when the electronic device 400 corrects a keyboard typo due to a slip, various embodiments for providing a typo correction method with high accuracy in which flexible filtering may be performed by providing a plurality of filters having different filter values will be described. Operations of the processor 410 to be described in greater detail below may be performed by loading instructions stored in the memory 440.

According to various embodiments, the processor 410 may include various processing circuitry and execute an application for inputting characters and numbers to the display 420. For example, the processor 410 may execute a single application for typing, may execute a first application that performs various functions, and may execute a second application for typing in a foreground text input field of the first application. For example, the processor 410 may display a keyboard on the display 420, may display characters or numbers on the display 420 based on a user input, and may execute the keyboard in a character input field while other applications are executed.

According to various embodiments, the processor 410 may generate a filter for filtering typos. According to an embodiment, the processor 410 may generate a first filter having a first time filter value (e.g., 250 ms) and a first magnitude filter value (e.g., 8 dp (device independent pixel)), and a second filter having a second time filter value (e.g., 300 ms) greater than the first time filter value and a second magnitude filter value (e.g., 20 dp) greater than the first magnitude filter value. For example, the processor 410 may generate a first filter having relatively small time filter value and magnitude filter value and a second filter having relatively large time filter value and magnitude filter value. Since the processor 410 determines a point touched by the user between a first point (e.g., the first point 212 of FIG. 2) and a second point (e.g., the second point 222 of FIG. 2) based on the filter value, a criteria for filtering the slip may be different depending on the situation. In a case in which the first filter is applied, the processor 410 may determine that the first point has been touched when a distance between the first point and the second point is less than the first magnitude filter value and a touch duration is less than the first time filter value, and may determine that the second point has been touched when either one of the above-mentioned two conditions is not satisfied. Similarly, in a case in which the second filter is applied, the processor 410 may determine that the first point has been touched when the distance between the first point and the second point is less than the second magnitude filter value and the touch duration is less than the second time filter value, and may determine that the second point has been touched when either one of the above-mentioned two conditions is not satisfied. Hereinafter, an example in which the processor 410 generates the first filter and the second filter to correct typos will be described, but the number of filters that the processor 410 can generate is not limited thereto. By filtering slips with three or more filters that further subdivide the filter values, typos may be corrected more precisely.

According to various embodiments, the processor 410 may acquire touch data from the touch sensor 432. When a user input event for the display 420 occurs, the touch data may include various pieces of information about the event. For example, the touch data may include information such as a first point where the user's touch starts, a second point where the touch ends, a touch duration, or a size of a touch area. When a slip occurs, the processor 410 may determine whether to filter the slip based on the touch data.

According to various embodiments, the processor 410 may acquire user characteristic information from the sensor module 430. The user characteristic information may include information on various factors affecting the performance of typing input. For example, the user characteristic information may include information about factors such as the user's behavioral pattern, gait, strokes, typos, touch area, key size spacing, finger size and shape, phone tilt, gripping hand, and/or typing speed. The processor 410 may determine whether to filter a slip with further reference to the user characteristic information.

For example, when a user performs typing while standing on a bus, there may be a higher possibility of slipping and making a typo compared to a case of performing typing in a stable posture. The processor 410 may acquire information on the user's use environment using the user characteristic information and may determine to use the second filter having a larger filter value because there is a high probability that a typo will occur. Conversely, when the user performs typing in a static space, it may be determined to use the first filter having a small filter value.

According to various embodiments, the processor 410 may determine which filter is applied based on the touch data. The processor 410 may determine which one of the first filter and the second filter is applied to correct a typo by analyzing the touch data and the user characteristic information. Hereinafter, a method for the processor 410 to determine a filter for typo correction will be described.

According to various embodiments, the processor 410 may determine a filter to be applied to correct a typo with respect to the center line of the keyboard. The center line of the keyboard may vertically bisect the keyboard and may be a virtual line that is not displayed on the display 420. The processor 410 may apply the first filter when the movement of the user's touch from the first point to the second point is closer to the center line with respect to the center line of the keyboard, and may apply the second filter when the movement thereof is farther away from the center line.

For example, when the first point is located inside the keycap of the "ㄱ" key of the keyboard and the second point is located inside the keycap of the "ㅅ" key of the keyboard, the processor 410 may determine that the user's touch has moved in a direction approaching the center line. The processor 410 may apply the first filter to prevent and/or reduce typos. Since the first filter has the relatively small time filter value and magnitude filter value, a smaller number of slips may be filtered than when the second filter is applied. For example, when the touch duration is within the first time filter value and the distance between the first point and the second point is within the first magnitude filter value, the processor 410 may determine that the user's touch is a movement between the keycaps instead of a slip. In this case, the processor 410 may determine that the user has touched the "ㅅ" key of the keyboard including the second point where the touch ends, rather than the "ㄱ" key of the keyboard including the first point where the touch starts. Similarly, when the touch duration is equal to or greater than the first time filter value or the distance between the first point and the second point is equal to or greater than the first magnitude filter value, the processor 410 may determine that the user's touch is a slip, and thus may determine that the "ㄱ" key including the first point where the touch starts has been touched.

When the first point is located inside the "ㅅ" keycap of the keyboard and the second point is located inside the "ㄱ" keycap of the keyboard, the processor 410 may determine that the user's touch moves in a direction farther away from the center line. On the other hand, the processor 410 may perform typo filtering by applying the second filter.

According to an embodiment, the processor 410 may determine the moving direction of the user's touch with respect to the location of the first point. For example, when the first point is located inside the "ㅅ" key of the keyboard and the second point is located inside the "ㅛ" key of the keyboard, the user's touch may move in a direction closer to the center line when moving from the first point to the center line, but may move in the direction away from the center line when moving to the "ㅛ" key of the keyboard by crossing the center line. In this case, the processor 410 may apply the first filter because the user's touch moves in the direction closer to the center line when viewed from the first point with respect to the location of the first point.

According to various embodiments, the processor 410 may configure a correction area on the keyboard and may apply a filter to correct typos when a slip occurs inside the correction area. For example, the processor 410 may determine that the user has touched the second point without additional filtering with respect to the slip occurring outside the correction area. According to an embodiment, the correction area may be located at the center of the keyboard, may have a circular shape with a predetermined (e.g., specified) radius (e.g., 70 dp) with respect to the central point of the keyboard, or may have a rectangular shape with a predetermined size. The processor 410 may examine whether to apply what kind of filter only when the first point is located inside the correction area, and may not filter, when the first point is located outside the correction area, a slip even if the second point is located inside the correction area. The correction area may be determined from the time of manufacturing the electronic device 400 or may be determined by the processor 410.

According to various embodiments, the processor may reconfigure the touch center point inside the keycap based on the touch data. For example, the processor may configure the center of the first keycap as the touch center point. The processor may acquire touch data for the first keycap, and may calculate the touch center point by weighting the touch data according to the frequency of occurrence of the touch. For example, the processor may reconfigure the touch center point close to a point where many touches are made inside the first keycap. According to an embodiment, the processor may calculate the touch center point using a key recognition area learning algorithm.

According to various embodiments, the processor may define the correction area based on the touch center point. Since many slips may occur in a place where a user's touch is frequently generated, the processor may configure a predetermined (e.g., specified) area as the correction area based on the touch center point.

According to various embodiments, the processor 410 may determine whether a slip occurs from the inside to the outside of the keycap or from the outside to the inside thereof based on the acquired touch data, and may determine a filter to be applied to correct typos. According to an embodiment, when the first point is located in a blank space outside the keycap and the second point is located inside the keycap, the processor 410 may apply the first filter to correct the typos. Conversely, when the first point is located inside the keycap and the second point is located in a blank space outside the keycap, the second filter may be applied.

For example, when the user's touch starts between the "ㅎ" key of the keyboard and the "ㄹ" key of the keyboard and ends at the "ㄹ" key of the keyboard, the processor 410 may determine a filter for correction. Since the user's touch moves from the outside to the inside of the keycap, the processor 410 may apply the first filter to correct a typo. For example, when the user's touch moves from the outside to the inside of the keycap, the processor 410 may determine that the "ㄹ" key of the keyboard including the second point has been touched, based on a determining that the typo has been corrected to a correct typing. Conversely, when the user's touch starts at the "ㄹ" key of the keyboard and ends between the "ㅎ" key of the keyboard and the "ㄹ" key of the keyboard, the processor 410 may apply the second filter. Moving from the inside of the keycap to the outside thereof may be determined that a typo has occurred, so that it can be determined that the "ㄹ" key of the keyboard including the first point has been touched.

According to an embodiment, the processor 410 may configure priorities among criteria when determining a filter for correcting typos. For example, a case in which the first point is located in a blank between the "ㄹ" key and "ㅎ" key of the keyboard and the second point is located inside the "ㄹ" key of the keyboard may be considered. Since the user's touch moves in a direction away from the center line when viewed with respect to the center line, the processor 410 may apply the second filter. However, since the user's touch moves from the outside to the inside of the keycap when viewed with respect to the keycap, the processor 410 may apply the first filter. When a collision occurs in this way, the processor 410 may determine which filter to be applied according to a criterion having a higher priority. That is, the processor 410 may configure the priority with respect to the center line to be higher, and thus may determine to apply the second filter in the above example.

According to various embodiments, the processor 410 may correct typos occurring in various function keys in addition to the number and character keycaps. For example, the processor 410 may also correct typos occurring in function keys such as the space key, the backspace key, the shift key, the enter key, the Korean/English key, the punctuation key and/or the special code key. For example, the user's touch may slip and press the "ㅜ" key of the keyboard while trying to press the space key. When the movement from the first point to the second point is in a downward direction, the processor 410 may apply the first filter, and when the movement from the first point to the second point is in an upward direction, the processor 410 may apply the second filter. For example, when the first point is located inside the space keycap and the second point is located inside the "ㅜ" key of the keyboard, since the moving direction is upward, the processor 410 may apply the second filter.

According to various embodiments, the processor 410 may determine a filter to be applied to correct typos based on the touch sensitivity of the touch sensor 432. The touch sensitivity may, for example, and without limitation, be a minimum pressure of a touch required to activate the function of a UI displayed on the display 420. The processor 410 may measure touch sensitivity based on the acquired touch data, and may determine a filter to be applied to correct typos based on the measured touch sensitivity. For example, when the touch sensitivity is configured to be high, the pressure for activating the function of the UI may be relatively small. When the touch sensitivity is high, the processor 410 may determine to apply the first filter having a small magnitude filter value because there is a high possibility that a typo may occur. Conversely, when the touch sensitivity is configured to be low, it may be determined to apply the second filter having a large magnitude filter value.

According to various embodiments, the processor 410 may correct typos using the filter determined to be applied. For example, the processor 410 may correct typos by identifying the time filter value and the magnitude filter value of the filter and identifying whether the user's touch matches each filter value based on the touch data. For example, in a case in which the processor 410 determines to apply the first filter, a distance between the first point and the second point on the touch data is less than a first magnitude filter value and the touch duration is less than a first time filter value, the processor 410 may filter the corresponding slip and may determine that the user has touched the first point. Conversely, when the distance between the first point and the second point is equal to or greater than the first magnitude filter value or the touch duration is equal to or greater than the first time filter value, the processor 410 does not filter the corresponding slip and may determine that the user has touched the second point. The processor 410 may correct a touch input and may display the corrected touch input on the display 420 without a separate user input.

According to various embodiments, the processor 410 may accumulate user's personal touch data and user characteristic information and may store the accumulated information in the memory 440. The touch data generated by the touch sensor 432 and the user characteristic information generated by the sensor module 430 may include information on the tendency of the user of the electronic device 400 to touch the keyboard. The processor 410 may analyze the touch data and the user characteristic information and may store the analyzed information in the memory 440 to be used to correct typos later.

According to various embodiments, the processor 410 may generate a personalization algorithm using the stored touch data, user characteristic information, and/or a deep learning algorithm. The processor 410 may learn factors affecting character input performance using an artificial intelligence model, and such an artificial intelligence model may be generated through machine learning. According to an embodiment, such learning may be performed in the electronic device 400 itself on which the artificial intelligence model is performed, or may be performed through a separate server. The learning algorithm, for example, may include at least one of supervised learning, unsupervised learning, semi-supervised learning, and reinforcement learning, and is not limited to the above-described example.

According to various embodiments, the artificial intelligence model may include a plurality of artificial neural network layers. The artificial neural network may include a deep neural network, a convolutional neural network (CNN), a recurrent neural network (RNN), a restricted Boltzmann machine (RBM), a deep belief network (DBN), a bidirectional recurrent deep neural network (BRDNN), and a deep Q network, or a combination of two or more of the above-mentioned networks, but is not limited to the above-described examples. The artificial intelligence model may additionally or alternatively include a software structure in addition to the hardware structure.

According to various embodiments, the processor 410 may determine whether to correct a typo using a personalization algorithm. The processor 410 may change the time filter value and the magnitude filter value of the filter using a user-specific characteristic, or may determine a touched key of the keyboard differently. For example, when the user uses the keyboard with his/her right hand a lot, a lot of slips may occur on keys of the keyboard positioned to the left of the center line. For example, a user may frequently touch keys positioned biased to the right from the center of the keyboard or a slip may frequently occur to the right. The processor 410 may decrease the magnitude filter value when a slip occurs to the right and may increase the magnitude filter value when a slip occurs to the left occurs, using a personalization algorithm reflecting the user's unique characteristics. Even if the slip occurs to the right, it may be determined to be a typo and it is easy to be recognized that the first point has been touched. When the slip occurs to the left, it may be determined to be an intentional slip and it may be recognized that the second point has been touched.

Figure 5A:
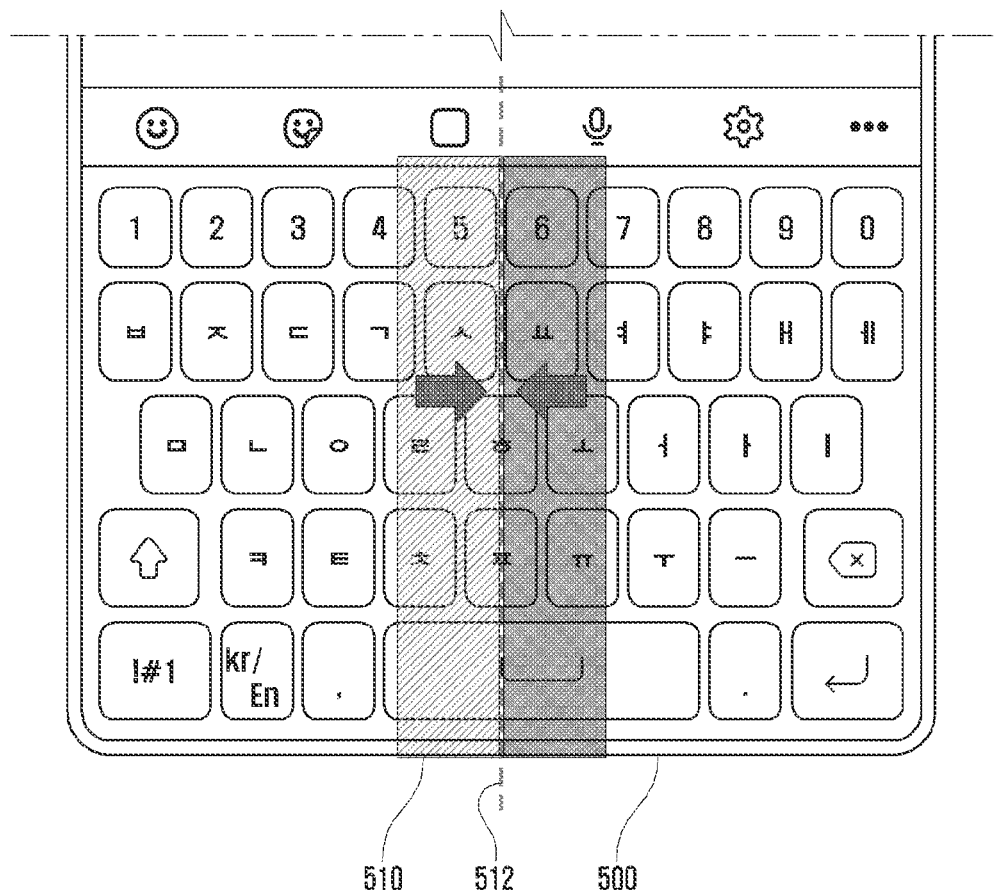
FIGS. 5A, 5B, and 5C are diagrams illustrating examples of correcting a typo when a slip occurs near a center line of a keyboard according to various embodiments.
Figure 5B:
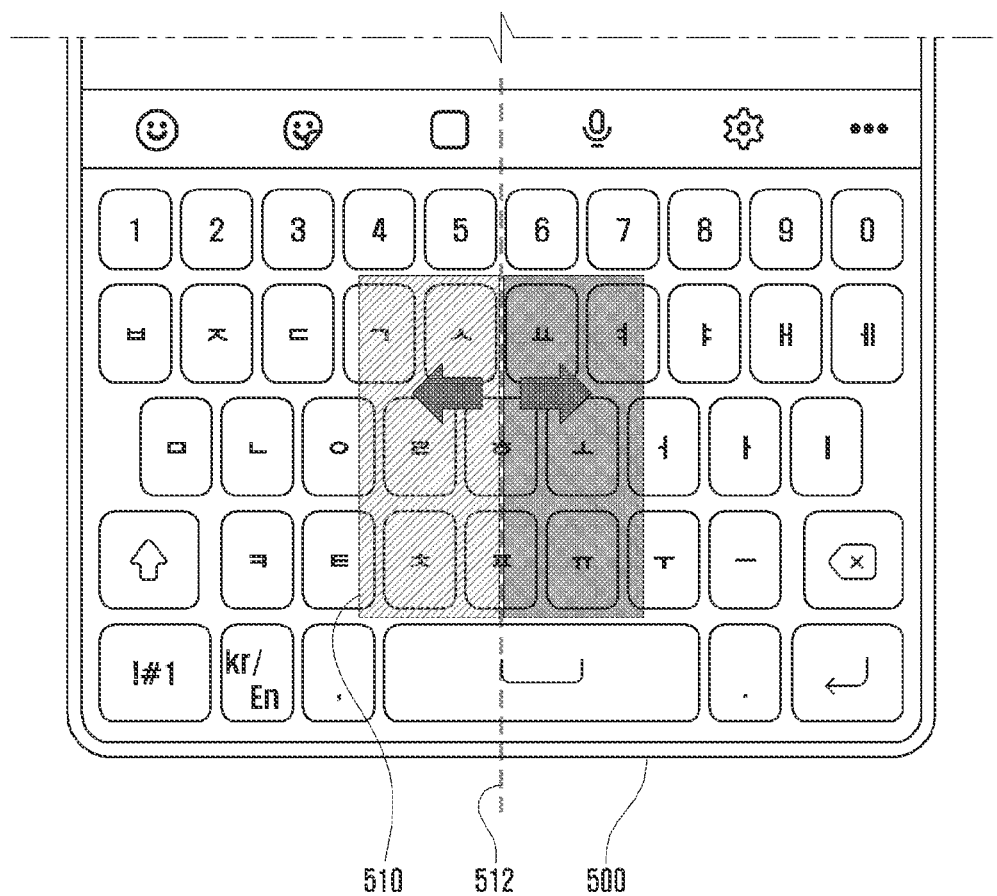
Figure 5C:
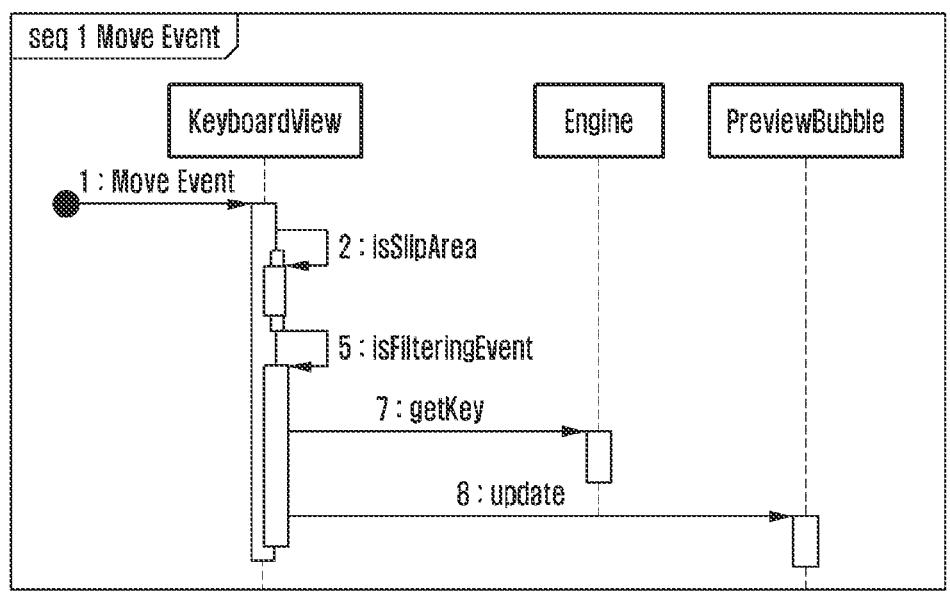

FIGS. 5A, 5B, and 5C are diagrams illustrating examples of correcting a typo when a slip occurs near a center line of a keyboard according to various embodiments.

According to various embodiments, a processor (e.g., the processor 410 of FIG. 4) may determine a filter to be applied to correct typos with respect to a center line 512 of the keyboard. According to an embodiment, the processor 410 may configure a correction area 510 to which a typo correction filter is to be applied in the center of the keyboard 500. The shape of the correction area 510 may be a circular shape having a predetermined (e.g., specified) radius with the center of the keyboard as a center, or a rectangular shape having a predetermined size. The processor 410 may determine a filter to be applied to a slip occurring in the correction area 510. Hereinafter, the processor 410 that determines a filter for typo correction will be described in greater detail.

According to various embodiments, the processor 410 may identify coordinates of a first point (e.g., the first point 212 in FIG. 2) and a second point (e.g., a second point 222 in FIG. 2) based on touch data. According to various embodiments, the processor 410 may determine whether a moving direction from the first point to the second point is closer to or farther away from the center line 512. The processor 410 may determine a filter to be applied to correct typos according to the moving direction of the user's touch.

Referring to FIG. 5A, when the moving direction from the first point to the second point is a direction (reverse direction) closer to the center line 512, the processor 410 may determine to apply the first filter. When the user's touch moves in a direction closer to the center line 512, the processor 410 may determine that there is a higher probability that typos will be corrected due to the corresponding slip than a probability that typos will occur due to the slip. With respect to the center line 512 of the keyboard, the keyboard on the left tends to be touched with the left hand, and the keyboard on the right tends to be touched with the right hand. A slip to the left may be more likely to occur when a touch occurs with the left hand, and a slip to the right may be highly likely to occur when a touch occurs with the right hand. Therefore, when a slip occurs in the reverse direction, there may be a high possibility that the user moved the touch intentionally, and the processor 410 may reduce filtering for the reverse slip to determine that the user has touched the second point. The processor 410 may determine whether to filter the slip using a first time filter value and a first magnitude filter value of the first filter.

For example, when the first point is inside the "ㄱ" key of the keyboard and the second point is inside the "ㅅ" key of the keyboard, the processor 410 may determine to apply the first filter. When the moving from the first point to the second point is less than a first magnitude filter value and the touch duration is less than a first time filter value, the processor 410 may filter a corresponding slip and may determine that the user has touched the "ㄱ" key of the keyboard. Conversely, when the moving from the first point to the second point is equal to or greater than the first magnitude filter value or the touch duration is equal to or greater than the first time filter value, the processor 410 may determine that the user has touched the "ㅅ" key of the keyboard. Since the first filter has a relatively small time filter value and magnitude filter value, the processor 410 may reduce filtering for a reverse slip to determine that the user has touched the second point. Table 3 below shows the results of correcting slips by applying the first filter. Referring to Table 3, it can be seen that compared with Table 2, the number of times a typo occurs due to a slip is reduced compared to the case where no filter is applied.

TABLE 3

| | 1 Column | 2 Column | 3 Column | 4 Column | 5 Column | 6 Column | 7 Column | 8 Column | 9 Column | 10 Column |
|---|---|---|---|---|---|---|---|---|---|---|
| 1 row | 0 times | 0 times | ↘(50%) ↙(50%) Total 2 times | ↘(33%) ↙(33%) Total 3 times | ←(75%) ↖(25%) Total 4 times | 0 times | 0 times | 0 times | 0 times | 0 times |
| 2 row | 0 times | →(83%) ↗(16%) Total 6 times | →(66%) ↗(16%) Total 3 times | 0 times | 0 times | ←(100%) total 2 times | 0 times | 0 times | 0 times | 0 times |
| 3 row | 0 times | 0 times | 0 times | 0 times | ↑(100%) Total 1 time | 0 times | →(100%) total 1 time | 0 times | 0 times | 0 times |
| 4 row | 0 times | 0 times | 0 times | 0 times | 0 times | 0 times | 0 times | ↑(50%) ↖(50%) Total 2 times | 0 times | 0 times |

Referring to FIG. 5B, when the moving direction from the first point to the second point is a direction (forward direction) farther away from the center line 512, the processor 410 may determine to apply the second filter. As set forth above, when the user's touch slips in the reverse direction, the first filter with a relatively small filter value may be applied because a low probability that a typo occurs, but when the user's touch slips in the forward direction, the second filter with a relatively large filter value may be applied due to a high probability that a typo occurs.

For example, when the first point is inside the "ㅛ" key of the keyboard and the second point is inside the "ㅓ" key of the keyboard, the processor 410 may apply the second filter based on the touch data. When a distance between the first point and the second point is less than a second magnitude filter value and the touch duration is less than a second time filter value, the processor 410 may filter the corresponding slip and may determine that the user has touched the "⊥" key of the keyboard. When the distance between the first point and the second point is equal to or greater than the second magnitude filter value or the touch duration is equal to or greater than the second time filter value, the processor 410 does not filter the slip and may determine that the user has touched the "ㅓ" key of the keyboard. Since the second filter has a relatively large filter value, the probability that a slip is filtered may be higher than when the first filter is applied. Table 4 below shows the results of correcting slips by applying the second filter. Referring to Table 4, it can be seen that the number of times a typo occur due to slips is reduced compared with Table 2.

602 of the keycap, it is difficult to see that the user has touched the black space with an intention, so that the processor 410 may determine that the corresponding typo is corrected as a correct typing by reflecting the slip.

Similarly, when the first point is located inside 604 the keycap and the second point is located outside 602 the keycap, the processor 410 may apply the second filter. For example, when the first point is located on the "ㄹ" key of the keyboard and the second point is located in the blank space between the "ㅇ" key of the keyboard and the "ㄹ" key of the keyboard, the processor 410 may apply the second filter to filter the corresponding slip. When the slip occurs into the blank space, it is difficult to see that the user's touch has intentionally slipped because no key is input. Therefore,

TABLE 4

| | 1 Column | 2 Column | 3 Column | 4 Column | 5 Column | 6 Column | 7 Column | 8 Column | 9 Column | 10 Column |
|---|---|---|---|---|---|---|---|---|---|---|
| 1 row | 0 times | ↘(100%) Total 2 times | ↘(100%) Total 1 time | ←(100%) total 1 time | 0 times | 0 times | 0 times | 0 times | ✓(100%) Total 1 time | 0 times |
| 2 row | 0 times | ←(100%) total 1 time | →(66%) ↘(33%) Total 3 times | →(66%) ←(33%) total 3 times | ↓(33%) ✓(33%) Total 6 times | 0 times | →(100%) total 1 time | 0 times | 0 times | 0 times |
| 3 row | 0 times | 0 times | 0 times | 0 times | 0 times | 0 times | 0 times | →(50%) ←(50%) total 2 times | 0 times | 0 times |
| 4 row | 0 times | 0 times | 0 times | 0 times | 0 times | 0 times | ↗(100%) total 1 time | 0 times | 0 times | 0 times |

Referring to FIG. 5C, the processor 410 may determine whether to apply the first filter or the second filter based on the touch data. After determining the filter to be applied, the processor 410 may determine whether to filter the slip based on the time filter value and the magnitude filter value of each filter, and may finally determine the key of the keyboard touched by the user to display the determined key on a display (e.g., the display 420 of FIG. 4). When a touch event (move event) occurs, the processor 410 may first identify whether the touch event occurs inside the correction area 510 (isSlipArea). Accordingly, it is possible to determine a filter to be applied to correct typos, and determine whether to filter a slip (isFilteringEvent). The processor 410 may determine whether to filter the slip, may determine the key of the keyboard touched by the user, and may display the determined key on the display 420.

Figure 6A:
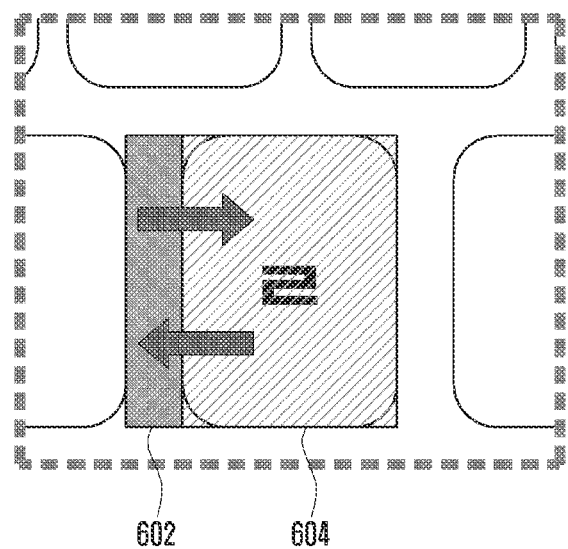
FIGS. 6A and 6B are diagrams illustrating examples of correcting a typo when a slip occurs inside and outside a keycap according to various embodiments.
Figure 6B:
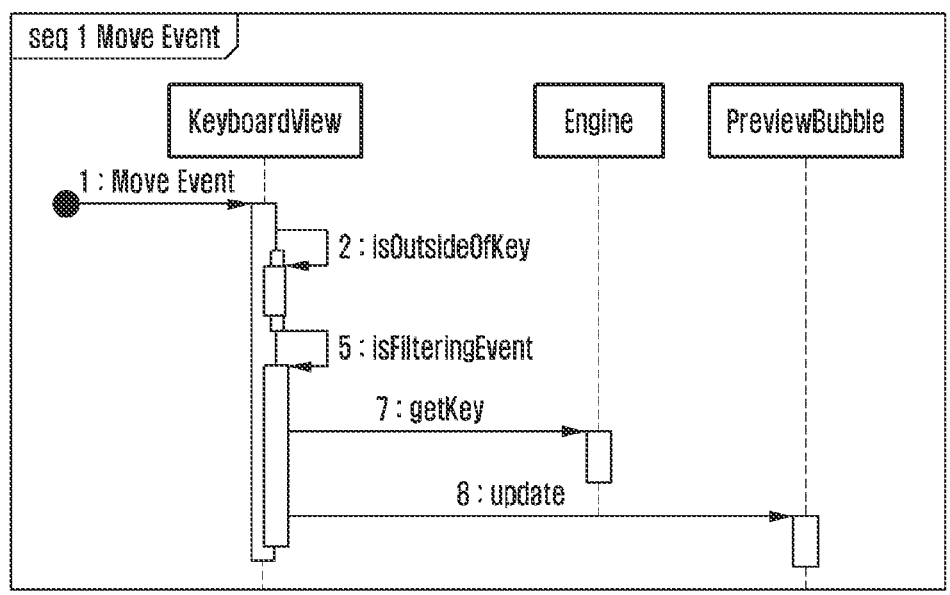

FIGS. 6A and 6B are diagrams illustrating an example of correcting a typo when a slip occurs inside and outside a keycap according to various embodiments.

Referring to FIG. 6A, a processor (e.g., the processor 410 of FIG. 4) may correct a typo caused by a slip occurring inside a keycap 604 and outside a keycap 602. According to various embodiments, when a first point (e.g., the first point 212 in FIG. 2) is located outside 602 of the keycap and a second point (e.g., the second point 222 in FIG. 2) is located inside 604 of the keycap, the processor 410 may apply the first filter. For example, when the first point is located in a blank space between the "ㅇ" key of the keyboard and the "ㄹ" key of the keyboard and the second point is located on the "ㄹ" key of the keyboard, the processor 410 may actively reflect the corresponding slip by applying the first filter. When the user touches the blank space of the outside the processor 410 may not reflect the slip and may determine that the first point has been touched.

According to various embodiments, after determining the filter to be applied, the processor 410 may determine whether to filter the slip based on touch data. When the first filter is applied, the probability of determining that the second point is touched is high because the filter value is relatively small, and when the second filter is applied, the probability of determining that the first point is touched is high because the filter value is relatively large.

Referring to FIG. 6B, after determining the filter for filtering the slip occurring inside 604 the keycap and outside 602 the keycap, the processor 410 may correct a typo according to the filter. When a touch event is received, the processor 410 may determine whether the first point and the second point are located inside or outside the keycap, and may determine the filter to be applied based on the determined information (isOutsideOfKey). The processor 410 may determine whether to filter the slip (isFilteringEvent). The processor 410 may correct a typo and may display the finally determined key on a display (e.g., the display 420 of FIG. 4).

Figure 7:
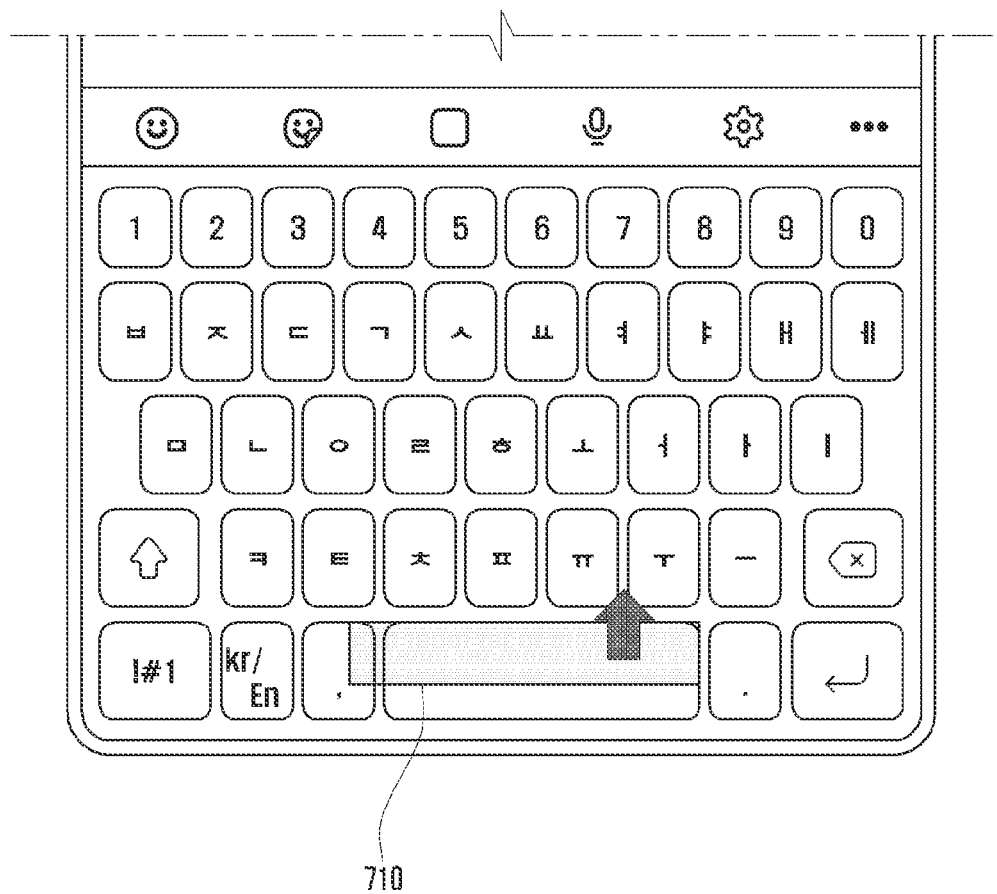
FIG. 7 is a diagram illustrating an example of correcting a typo when the typo occurs in an area other than a character keyboard according to various embodiments.

FIG. 7 is a diagram illustrating an example of correcting a typo when the typo occurs in an area other than a character keyboard according to various embodiments.

Referring to FIG. 7, even when a slip occurs in function keys other than the character and number keyboards, typos may be corrected. Although the function keys do not generate as many touches as the character and number keyboards, a typo caused by a slip can be corrected using the same method.

For example, a processor (e.g., the processor 410 of FIG. 4) may correct a typo regarding a slip occurring in the space key. The processor 410 may apply the first filter when the user's touch slips from the outside to the inside of the space keycap, and may apply the second filter when the user's touch slips from the inside to the outside of the keycap.

According to various embodiments, the processor 410 may configure a correction area 710 around a function key for which a typo is to be filtered. For example, when it is desired to filter a slip occurring in the space key, the processor 410 may configure the correction area 710 around the space key, thereby correcting a typo occurring when a touch starts within the correction area 710.

According to various embodiments, when a slip occurs from the space key to the "ㅜ" key of the keyboard or the "ㅠ" key of the keyboard, the processor 410 may filter the slip. For example, the processor 410 may determine to apply the first filter when the slip occurs in the 6 o'clock direction, and to apply the second filter when the slip occurs in the 12 o'clock direction. When the slip occurs in the 6 o'clock direction, since the user's touch slips from the "ㅜ" key of the keyboard to the space keyboard, the processor 410 may determine that the user intended to press the space key and may apply the first filter having a relatively small filter value. When a slip occurs in the 12 o'clock direction, since the user's touch slips from the space key to the "ㅜ" key of the keyboard, the processor 410 may determine that the user intended to press the space key and may apply the second filter with a relatively large filter value to filter the slip.

An electronic device (e.g., the electronic device 400 of FIG. 4) according to various example embodiments may include: a display (e.g., the display 420 of FIG. 4), a sensor module (e.g., the sensor module 430 of FIG. 4) including a touch sensor (e.g., the touch sensor 432 of FIG. 4) configured to receive a touch input and generate touch data, a memory (e.g., the memory 440 of FIG. 4), and a processor operatively connected to the display, the sensor module, and the memory, wherein the processor may be configured to: generate a first filter having a first time filter value and a first magnitude filter value, generate a second filter having a second time filter value greater than the first time filter value and a second magnitude filter value greater than the first magnitude filter value, acquire the touch data including a first point where the touch starts and a second point where the touch ends, apply the first filter based on a moving from the first point to the second point being closer to a center line (e.g., the center line 512 of FIG. 5A) vertically bisecting a keyboard, apply the second filter based on the moving being farther away from the center line, determine that a key of the keyboard corresponding to the first point has been touched based on a duration of the touch input being less than the time filter value of the filter and a distance between the first point and the second point being less than the magnitude filter value, and determine that a key of the keyboard corresponding to the second point has been touched based on the duration of the touch input being equal to or greater than the time filter value of the filter and the distance between the first point and the second point being equal to or greater than the magnitude filter value.

According to various example embodiments, the processor may be configured to: configure a correction area on the keyboard, determine whether the first point belongs to the correction area, apply the filter based on the first point belonging to the correction area, and not apply the filter based on the first point not belonging to the correction area.

According to various example embodiments, the processor may be configured to: apply the first filter based on the first point being outside (e.g., outside 602 the keycap of FIG. 6A) a keycap and the second point being inside (e.g., inside 604 the keycap of FIG. 6A) the keycap, and apply the second filter based on the first point being outside the keycap and the second point being inside the keycap.

According to various example embodiments, the touch data may include information on a touch point, a touch duration, and a size of a touch area.

According to various example embodiments, the sensor module may be configured to: generate characteristic information including a gait and a finger size, and the processor may be configured to: acquire the characteristic information from the sensor module and determine the filter to be applied to correct a typo based on the user characteristic information.

According to various example embodiments, the processor may be configured to: determine touch sensitivity of the display, and determine the filter to be applied to correct a typo based on the touch sensitivity.

According to various example embodiments, the processor may be configured to learn by inputting the acquired touch data into a deep learning algorithm.

According to various example embodiments, the deep learning algorithm may include a plurality of artificial neural network layers.

According to various example embodiments, the processor may be configured to: generate a personalization algorithm for each user using the deep learning algorithm, and may determine the filter to be applied to correct a typo based on the personalization algorithm.

According to various example embodiments, the first filter may have a magnitude filter value of 8 dp.

According to various example embodiments, the second filter may have a magnitude filter value of 20 dp.

Figure 8:
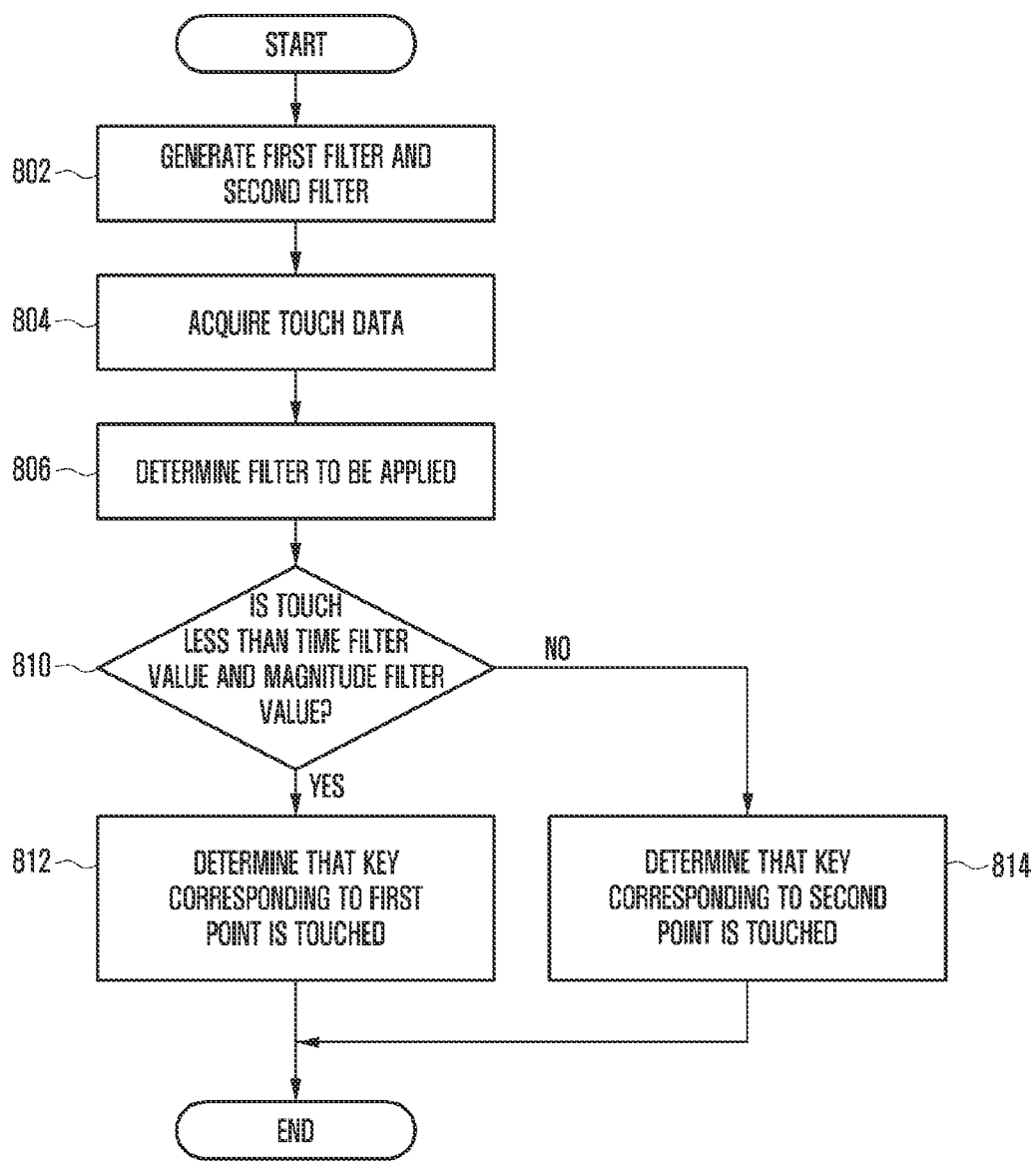
FIG. 8 is a flowchart illustrating an example method of correcting a typo by an electronic device according to various embodiments.

FIG. 8 is a flowchart illustrating an example method of correcting a typo by an electronic device according to various embodiments.

According to various embodiments, operations performed in an electronic device (e.g., the electronic device 101 of FIG. 1 or the electronic device 400 of FIG. 4) may be performed by a processor (e.g., the processor 120 of FIG. 1 or the processor 410 of FIG. 4) including at least one processing circuitry of the electronic device. According to an embodiment, the operations performed in the electronic device may be stored in a memory (e.g., the memory 130 of FIG. 1 or the memory 440 of FIG. 4), and may be performed by instructions which, when executed, cause the processor to perform operations corresponding to the instructions.

According to various embodiments, in operation 802, the electronic device 400 may generate a first filter and a second filter. The electronic device 400 may generate a first filter having a first time filter value (e.g., 250 ms) and a first magnitude filter value (e.g., 8 dp), and a second filter having a second time filter value (e.g., 300 ms) greater than the first time filter value and a second magnitude filter value (e.g., 20 dp) greater than the first magnitude filter value. For example, the electronic device 400 may generate the first filter having relatively small time filter value and magnitude filter value and the second filter having relatively large filter values. The electronic device 400 may determine a point touched by the user among a first point (e.g., the first point 212 of FIG. 2) and a second point (e.g., the second point 222 of FIG. 2) based on the filter values, so that the criteria for filtering the corresponding slip may vary depending on the situation. In a case in which the first filter is applied, the electronic device 400 may determine that the user has touched the first point when a distance between the first point and the second point is less than the first magnitude filter value and the touch duration is less than the first time filter value, and may determine that the user has touched the second point when either one of the above-mentioned two conditions is not satisfied. Similarly, in a case in which the second filter is applied, the electronic device 400 may determine that the user has touched the first point when the distance between the first point and the second point is less than the second magnitude filter value and the touch duration is less than the second time filter value, and may determine that the user has touched the second point when either one of the above-mentioned two conditions is not satisfied. Hereinafter, it will be described that the electronic device 400 generates the first filter and the second filter to correct a typo. However, the number of filters that the electronic device 400 can generate is not limited thereto, and three or more filters may be used to filter the slip, thereby correcting the typo more precisely.

According to various embodiments, in operation 804, the electronic device 400 may acquire touch data from a touch sensor (e.g., the touch sensor 432 of FIG. 4). When a user input event for a display (e.g., the display 420 of FIG. 4) occurs, the touch data may include various types of information about the event. For example, the touch data may include information such as a first point where the user's touch starts, a second point where the touch ends, a touch duration, or a size of a touch area. When a slip occurs, the electronic device 400 may determine whether to filter the slip based on touch data.

According to various embodiments, the electronic device 400 may acquire user characteristic information from a sensor module (e.g., the sensor module 430 of FIG. 4). The user characteristic information may include information on various factors affecting performance of text input. For example, the user characteristic information may include information about factors such as the user's behavioral pattern, gait, strokes, typos, touch area, key size spacing, finger size and shape, phone tilt, gripping hand, and/or typing speed. The electronic device 400 may determine whether to filter the slip with further reference to the user characteristic information.

According to various embodiments, in operation 806, the electronic device 400 may determine a filter to be applied to correct typos. The electronic device 400 may consider various factors to determine the filter. The electronic device 400 may determine which one of the first filter and the second filter is applied to correct a typo by analyzing the touch data and user characteristic information.

According to various embodiments, in operation 810, the electronic device 400 may compare a user touch with the time filter value and the magnitude filter value of the filter based on the touch data. When it is determined to apply the first filter, the electronic device 400 may use the first time filter value and the first magnitude filter value, and when it is determined to apply the second filter, the electronic device 400 may use the second time filter value and the second magnitude filter value. The electronic device 400 may apply the filter only when the time (touch duration) taken by the user from starting the touch at the first point to ending the touch at the second point is less than or equal to the time filter value. For example, when the user touches the keyboard for a long time, it may be determined that the user's touch has not accidentally slipped but that the user's touch is moving between the keyboard keys. The electronic device 400 may apply the filter only when the distance between the first point and the second point is equal to or less than the magnitude filter value. For example, when a moving distance of the user's touch is long before the touch ends, the electronic device 400 may determine this as an intended movement between the keys of the keyboard.

According to various embodiments, the electronic device 400 may configure priorities among criteria when determining a filter for correcting typos. For example, a case in which the first point is located in a blank between the "ㄹ" and "ㅎ" keys of the keyboard and the second point is located inside the "ㄹ" key of the keyboard may be considered. When viewed with respect to a center line (e.g., the center line 512 of FIG. 5A), the electronic device 400 may apply the second filter because the user's touch moves in a direction farther away from the center line. However, when viewed with respect to the keycap, since the user's touch moves from the outside to the inside of the keycap, the electronic device 400 may apply the first filter. When a collision occurs in this way, the electronic device 400 may determine which filter to be applied according to a criterion having a higher priority. For example, the electronic device 400 may configure the priority with respect to the center line to be higher, and thus may determine to apply the second filter in the above example. For example, the priority may be determined by the configuration of the electronic device 400 and may be changed by a user input.

According to various embodiments, the electronic device 400 may correct typos occurring in various function keys in addition to the number and character keycaps. For example, the electronic device 400 may correct typos occurring in function keys such as the space key, backspace key, shift key, enter key, Korean/English key, punctuation key, and/or special code key. For example, the user's touch may slip and press the "ㅜ" key of the keyboard while trying to press the space key. When the movement from the first point to the second point is in a downward direction, the electronic device 400 may apply the first filter, and when the movement from the first point to the second point is in an upward direction, the electronic device 400 may apply the second filter. For example, when the first point is located inside the space keycap and the second point is located inside the "ㅜ" key of the keyboard, since the moving direction is upward, the electronic device 400 may apply the second filter.

According to various embodiments, the electronic device 400 may determine a filter to be applied to correct typos based on the touch sensitivity of the touch sensor. The touch sensitivity may be a minimum pressure of a touch required to activate the function of a UI displayed on the display. The electronic device 400 may measure touch sensitivity based on the acquired touch data, and may determine a filter to be applied to correct typos based on the measured touch sensitivity. For example, when the touch sensitivity is configured to be high, the pressure for activating the function of the UI may be relatively small. When the touch sensitivity is high, the electronic device 400 may determine to apply the first filter having a small magnitude filter value because there is a high possibility that a typo may occur. Conversely, when the touch sensitivity is configured to be low, the electronic device 400 may determine to apply the second filter having a large magnitude filter value.

According to various embodiments, the electronic device 400 may accumulate user's personal touch data and user characteristic information and may store the accumulated information in a memory (e.g., the memory 440 of FIG. 4). The touch data generated by the touch sensor and the user characteristic information generated by the sensor module may include information on the tendency of the user of the electronic device 400 to touch the keyboard. The electronic device 400 may analyze the touch data and the user characteristic information and may store the analyzed information in the memory to be used to correct typos later.

According to various embodiments, the electronic device 400 may generate a personalization algorithm using the stored touch data for each user, user characteristic information, and/or a deep learning algorithm. The electronic device 400 may learn factors affecting character input performance using an artificial intelligence model, and such an artificial intelligence model may be generated through machine learning. According to an embodiment, such learning may be performed in the electronic device itself on which the artificial intelligence model is performed, or may be performed through a separate server. The learning algorithm, for example, may include at least one of supervised learning, unsupervised learning, semi-supervised learning, and reinforcement learning, and is not limited to the above-described example.

According to various embodiments, the artificial intelligence model may include a plurality of artificial neural network layers. The artificial intelligence model may additionally or alternatively include a software structure in addition to the hardware structure.

According to various embodiments, the electronic device 400 may determine whether to correct a typo using the personalization algorithm. The electronic device 400 may change the time filter value and the magnitude filter value of the filter using a user-specific characteristic, or may determine a touched key of the keyboard differently. For example, when the user uses the keyboard with his/her right hand a lot, a lot of slips may occur on keys of the keyboard positioned to the left of the center line. The user may frequently touch keys positioned biased to the right from the center of the keyboard or a slip may frequently occur to the right. The electronic device 400 may decrease the magnitude filter value when a slip occurs to the right and may increase the magnitude filter value when a slip occurs to the left occurs, using the personalization algorithm reflecting the user's unique characteristics. Even if the slip occurs to the right, it may be determined to be a typo and it is easy to be recognized that the first point has been touched. When the slip occurs to the left, it may be determined to be an intentional slip and it may be recognized that the second point has been touched.

According to various embodiments, in operation 812, when a distance between the first point and the second point is less than the magnitude filter value and a touch duration is less than the time filter value (Yes in operation 810), the electronic device 400 may determine that a key of the keyboard corresponding to the first point has been touched.

According to various embodiments, in operation 814, when the distance between the first point and the second point is equal to or greater than the magnitude filter value or the touch duration is equal to or greater than the time filter value (No in operation 810), the electronic device 400 may determine that a key of the keyboard corresponding to the second point has been touched.

Figure 9:
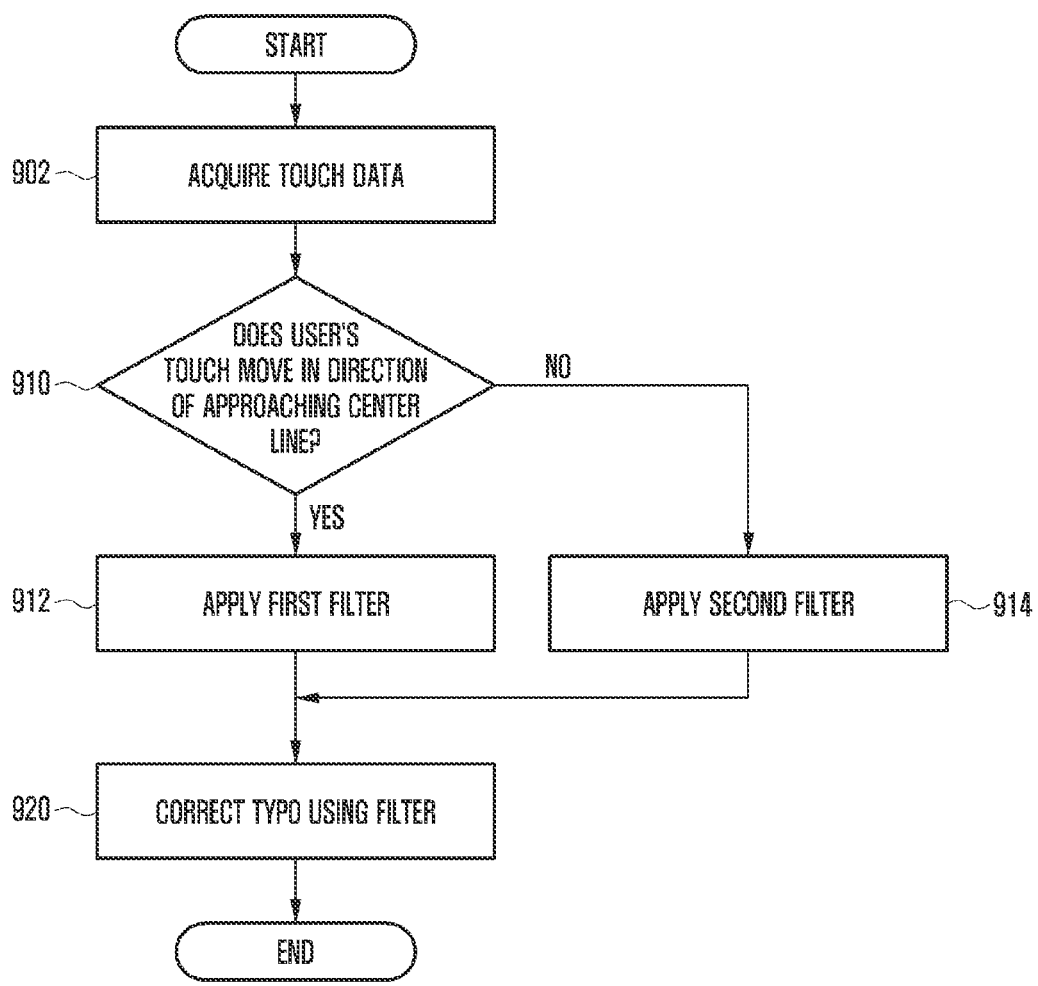
FIG. 9 is a flowchart illustrating an example method of correcting a typo when a slip occurs near a center line of a keyboard according to various embodiments.

FIG. 9 is a flowchart illustrating an example method of correcting a typo when a slip occurs near a center line of a keyboard according to various embodiments.

According to various embodiments, operations performed in an electronic device (e.g., the electronic device 101 of FIG. 1 or the electronic device 400 of FIG. 4) may be performed by a processor (e.g., the processor 120 of FIG. 1 or the processor 410 of FIG. 4) including at least one processing circuitry of the electronic device. According to an embodiment, the operations performed in the electronic device may be stored in a memory (e.g., the memory 130 of FIG. 1 or the memory 440 of FIG. 4), and may be performed by executing instructions causing the processor to operate.

According to various embodiments, in operation 902, the electronic device 400 may acquire touch data from a touch sensor (e.g., the touch sensor 432 of FIG. 4). The touch data may include information about a first point (e.g., the first point 212 of FIG. 2) where the user's touch starts, a second point (e.g., the second point 222 of FIG. 2) where the touch ends, and/or a touch duration. The electronic device 400 may acquire user characteristic information from a sensor module (e.g., the sensor module 430 of FIG. 4). For example, the user characteristic information may include individual input data such as gait, finger length, and/or input speed.

According to various embodiments, in operation 910, the electronic device 400 may determine the moving direction of the user's touch. The electronic device 400 may determine the moving direction of the touch based on the acquired touch data. For example, when the first point is located inside the "ㄹ" key of the keyboard and the second point is located inside the "ㅇ" key of the keyboard, the electronic device 400 may determine that the user's touch has moved in the 9 o'clock direction.

According to various embodiments, in operation 912, the electronic device 400 may apply the first filter (Yes in operation 910) when the user's touch moves in a direction closer to the center line of the keyboard (e.g., the center line 512 of FIG. 5A). The center line of the keyboard may vertically bisect the keyboard and may be a virtual line that is not displayed on a display (e.g., the display 420 of FIG. 4). The electronic device 400 may apply the first filter when the moving from the first point to the second point approaches the center line with respect to the center line of the keyboard, and may apply the second filter when the moving from the center line is farther away from the center line.

For example, when the first point is located inside the keycap of the "ㄱ" key of the keyboard and the second point is located inside the keycap of the "ㅅ" key of the keyboard, the electronic device 400 may determine that the user's touch has moved a direction closer to the center line. The electronic device 400 may apply the first filter to prevent and/or reduce typos. In this case, the electronic device 400 may determine that the user has touched the "ㅅ" key of the keyboard including the second point where the touch ends, rather than the "ㄱ" key of the keyboard including the first point where the touch starts. Similarly, when the touch duration is equal to or greater than the first time filter value or the distance between the first point and the second point is equal to or greater than the first magnitude filter value, the electronic device 400 may determine that the user's touch is a slip and the user has touched the "ㄱ" key of the keyboard including the first point where the touch starts.

According to various embodiments, in operation 914, when the user's touch moves in a direction farther away from the center line of the keyboard (No in operation 910), the electronic device 400 may apply the second filter. For example, when the first point is located inside the "ㅅ" keycap of the keyboard and the second point is located inside the "ㄱ" keycap of the keyboard, the electronic device 400 may determine that the user's touch has moved in the direction farther away from the center line. Contrary to the above example, the electronic device 400 may perform typo filtering by applying the second filter.

According to various embodiments, the electronic device 400 may determine the moving direction of the user's touch with respect to the location of the first point. For example, when the first point is located inside the "ㅅ" key of the keyboard and the second point is located inside the "ㅛ" key of the keyboard, the user's touch may move in a direction closer to the center line when moving from the first point to the center line, but may move in the direction away from the center line when moving to the "ㅒ" key of the keyboard by crossing the center line. In this case, the electronic device 400 may apply the first filter because the user's touch moves in the direction closer to the center line when viewed from the first point with respect to the location of the first point.

According to various embodiments, the electronic device 400 may configure a correction area (e.g., the correction area 510 of FIG. 5A) on the keyboard and may apply a filter to correct typos when a slip occurs inside the correction area. For example, the electronic device 400 may determine that the user has touched the second point without additional filtering with respect to the slip occurring outside the correction area. According to an embodiment, the correction area may be located at the center of the keyboard, may have a circular shape with a predetermined (e.g., specified) radius (e.g., 70 dp) with respect to the central point of the keyboard, or may have a rectangular shape with a predetermined (e.g., specified) size. The electronic device 400 may examine whether to apply what kind of filter only when the first point is located inside the correction area, and may not filter, when the first point is located outside the correction area, a slip even if the second point is located inside the correction area.

According to various embodiments, in operation 920, the electronic device 400 may correct a typo using the determined filter. The electronic device 400 may identify the time filter value and magnitude filter value of the determined filter, and may compare the identified values with the touch data. When the distance between the first point and the second point is less than the magnitude filter value and the touch duration is less than the time filter value, the electronic device 400 may filter the corresponding slip to determine that the user has touched the first point. Conversely, when the distance between the first point and the second point is equal to or greater than the magnitude filter value and the touch duration is equal to or greater than the time filter value, the electronic device 400 may reflect the corresponding slip to determine that the user has touched the second point.

Figure 10:
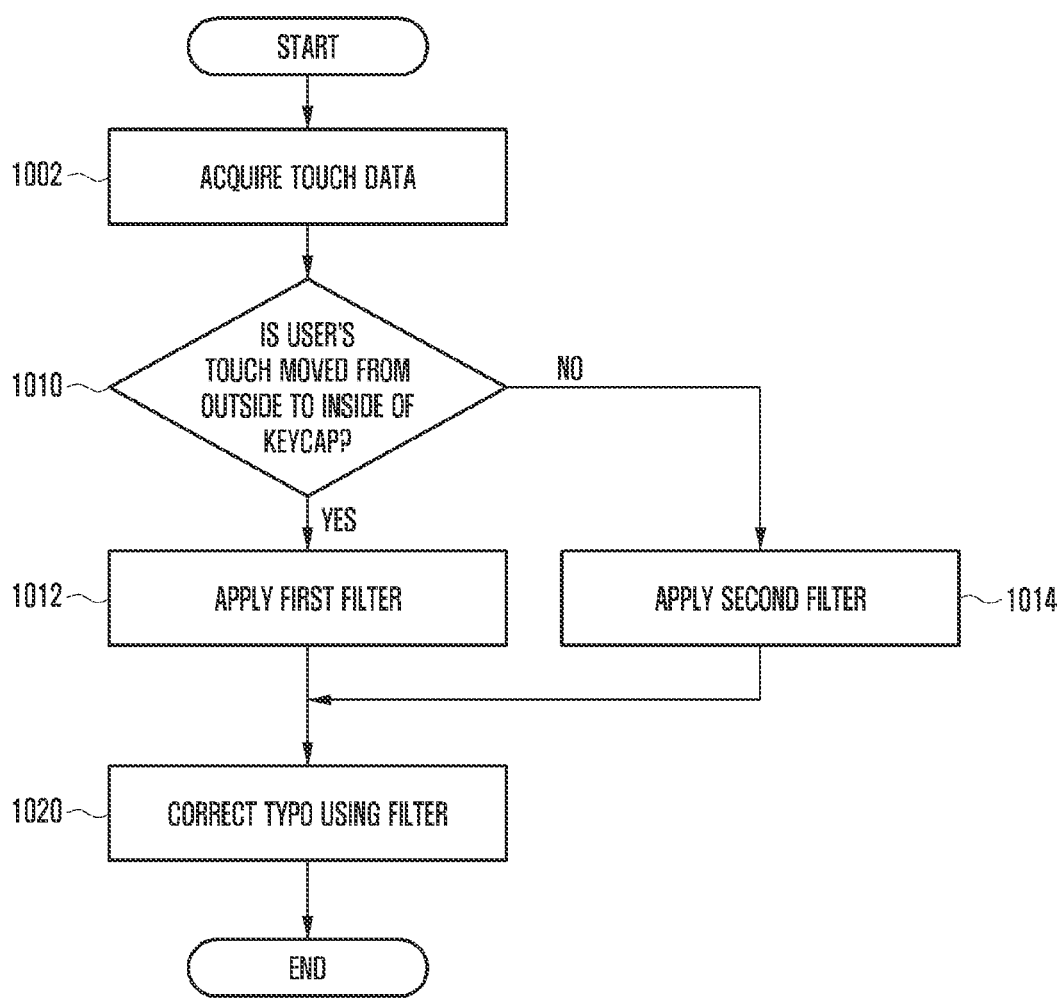
FIG. 10 is a flowchart illustrating an example method of correcting a typo when a slip occurs inside and outside a keycap according to various embodiments.

FIG. 10 is a flowchart illustrating an example method of correcting a typo when a slip occurs inside and outside a keycap according to various embodiments.

According to various embodiments, operations performed in an electronic device (e.g., the electronic device 101 of FIG. 1 or the electronic device 400 of FIG. 4) may be performed by a processor (e.g., the processor 120 of FIG. 1 or the processor 410 of FIG. 4) including at least one processing circuitry of the electronic device. According to an embodiment, the operations performed in the electronic device may be stored in a memory (e.g., the memory 130 of FIG. 1 or the memory 440 of FIG. 4), and may be performed by instructions which, when executed, cause the processor to perform operations corresponding to the instructions.

According to various embodiments, in operation 1002, the electronic device 400 may acquire touch data and/or user characteristic information from a touch sensor (e.g., the touch sensor 432 of FIG. 4). The description of the touch data and/or the user characteristic information is the same as above, and thus will be omitted.

According to various embodiments, in operation 1010, the electronic device 400 may determine the moving direction of the user's touch. In order to determine a filter to be applied for typo correction, the electronic device 400 may determine whether the user's touch slips from the inside to the outside of the keycap or from the outside to the inside of the keycap based on the acquired touch data.

According to various embodiments, in operation 1012, when the user's touch moves from the outside to the inside of the keycap (Yes in operation 1010), the electronic device 400 may apply the first filter. For example, when a first point (e.g., the first point 212 in FIG. 2) is a blank space between the "ㄹ" key of the keyboard and the "ㅎ" key of the keyboard and a second point (e.g., the second point 222 in FIG. 2) is located inside the "ㅎ" key of the keyboard, the electronic device 400 may filter the typo by applying the first filter.

According to various embodiments, in operation 1014, when the user's touch moves from the inside to the outside of the keycap (No in operation 1014), the electronic device 400 may apply the second filter. For example, when the first point is the "ㅎ" key and the second point is a blank space between the "ㄹ" key and the "ㅎ" key, the electronic device 400 may filter the typo by applying the second filter.

According to various embodiments, in operation 1020, the electronic device 400 may correct a typo using the determined filter. The electronic device 400 may determine whether to filter the slip by identifying the time filter value and the magnitude filter value of the determined filter and comparing them with the touch data.

A typo correction method of an electronic device according to various example embodiments may include: generating a first filter having a first time filter value and a first magnitude filter value, generating a second filter having a second time filter value greater than the first time filter value and a second magnitude filter value greater than the first magnitude filter value, acquiring touch data including a first point where a touch starts and a second point where the touch ends, applying the first filter based on a moving from the first point to the second point being closer to a center line that vertically bisects a keyboard, applying the second filter based on the moving being farther away from the center line, determining that a key of the keyboard corresponding to the first point has been touched based on a duration of the touch input being less than the time filter value of the filter and a distance between the first point and the second point being less than the magnitude filter value, and determining that a key of the keyboard corresponding to the second point has been touched based on the duration of the touch input being equal to or greater than the time filter value of the filter and the distance between the first point and the second point being equal to or greater than the magnitude filter value.

According to various example embodiments, the applying of the first filter or the second filter may further include: configuring a correction area on the keyboard, determining whether the first point belongs to the correction area, applying a filter based on the first point belonging to the correction area, and not applying a filter based on the first point not belonging to the correction area.

According to various example embodiments, the applying of the first filter or the second filter may further include: applying the first filter based on the first point being outside a keycap and the second point being inside the keycap, and applying the second filter based on the first point being inside the keycap and the second point being outside the keycap.

According to various example embodiments, the touch data may include information about a touch point, a touch duration, and a size of a touch area.

According to various example embodiments, the applying of the first filter or the second filter may further include: generating user characteristic information including a gait and a finger size, and further determining a filter to be applied for typo correction based on the user characteristic information.

According to various example embodiments, the applying of the first filter or the second filter may further include: determining touch sensitivity of the display, and determining a filter to be applied to typo correction based on the touch sensitivity.

According to various example embodiments, the applying of the first filter or the second filter may further include: learning by inputting the acquired touch data into a deep learning algorithm.

According to various example embodiments, the deep learning algorithm may include a plurality of artificial neural network layers.

According to various example embodiments, the applying of the first filter or the second filter may further include: generating a personalization algorithm for each user using the deep learning algorithm, and determining a filter to be applied to typo correction based on the personalization algorithm.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device comprising:
    a display;
    a sensor module including a touch sensor configured to receive a touch input and generate touch data;
    a memory; and
    a processor operatively connected to the display, the sensor module, and the memory,
    wherein the processor is configured to:
    generate a first filter having a first time filter value and a first magnitude filter value,
    generate a second filter having a second time filter value greater than the first time filter value and a second magnitude filter value greater than the first magnitude filter value,
    acquire the touch data including a first point where a touch starts and a second point where the touch ends,
    apply the first filter based on a moving from the first point to the second point being closer to a center line that vertically bisects a keyboard,
    apply the second filter based on the moving being farther away from the center line,
    determine that a key of the keyboard corresponding to the first point has been touched based on a duration of the touch input being less than the time filter value of the filter and a distance between the first point and the second point being less than the magnitude filter value, and
    determine that a key of the keyboard corresponding to the second point has been touched based on the duration of the touch input being equal to or greater than the time filter value of the filter and the distance between the first point and the second point being equal to or greater than the magnitude filter value.

2. The electronic device of claim 1, wherein the processor is configured to:
    configure a correction area on the keyboard,
    determine whether the first point is in the correction area,
    apply the filter based on the first point being in the correction area, and
    not apply the filter based on the first point not being in the correction area.

3. The electronic device of claim 1, wherein the processor is configured to:
    apply the first filter based on the first point being outside a keycap and the second point being inside the keycap, and
    apply the second filter based on the first point being outside the keycap and the second point being inside the keycap.

4. The electronic device of claim 1, wherein the touch data includes information on a touch point, a touch duration, and a size of a touch area.

5. The electronic device of claim 1, wherein
    the sensor module is configured to generate characteristic information including a gait and a finger size, and
    the processor is configured to:
    acquire the characteristic information from the sensor module, and
    determine the filter to be applied to correct a typo based on the characteristic information.

6. The electronic device of claim 1, wherein the processor is configured to: determine touch sensitivity of the display, and determine the filter to be applied to correct a typo based on the touch sensitivity.

7. The electronic device of claim 1, wherein the processor is configured to learn by inputting the acquired touch data into a deep learning algorithm.

8. The electronic device of claim 7, wherein the deep learning algorithm includes a plurality of artificial neural network layers.

9. The electronic device of claim 7, wherein the processor is configured to:
    generate a personalization algorithm using the deep learning algorithm, and
    determine the filter to be applied to correct a typo based on the personalization algorithm.

10. The electronic device of claim 1, wherein the first filter has a magnitude filter value of 8 dp.

11. The electronic device of claim 1, wherein the second filter has a magnitude filter value of 20 dp.

12. A typo correction method of an electronic device, comprising:
    generating a first filter having a first time filter value and a first magnitude filter value;
    generating a second filter having a second time filter value greater than the first time filter value and a second magnitude filter value greater than the first magnitude filter value;
    acquiring touch data including a first point where the touch starts and a second point where the touch ends;
    applying the first filter based on a moving from the first point to the second point being closer to a center line that vertically bisects a keyboard;
    applying the second filter based on the moving being farther away from the center line;
    determining that a key of the keyboard corresponding to the first point has been touched based on a duration of the touch input being less than the time filter value of the filter and a distance between the first point and the second point being less than the magnitude filter value; and determining that a key of the keyboard corresponding to the second point has been touched based on the duration of the touch input being equal to or greater than the time filter value of the filter and the distance between the first point and the second point being equal to or greater than the magnitude filter value.

13. The method of claim 12, wherein the applying of the first filter or the second filter further includes:

configuring a correction area on the keyboard, determining whether the first point is in the correction area, applying a filter based on the first point being in to the correction area, and not applying a filter based on the first point not being in the correction area.

14. The method of claim 12, wherein the applying of the first filter or the second filter further includes:

applying the first filter based on the first point being outside the keycap and the second point being inside the keycap, and applying the second filter based on the first point being inside the keycap and the second point being outside the keycap.

15. The method of claim 12, wherein the touch data includes information about a touch point, a touch duration, and a size of a touch area.

16. The method of claim 12, wherein the applying of the first filter or the second filter further includes:

generating characteristic information including a gait and a finger size, and determining a filter to be applied for typo correction based on the characteristic information.

17. The method of claim 12, wherein the applying of the first filter or the second filter further includes:

determining touch sensitivity of the display, and determining a filter to be applied to typo correction based on the touch sensitivity.

18. The method of claim 12, wherein the applying of the first filter or the second filter further includes learning by inputting the acquired touch data into a deep learning algorithm.

19. The method of claim 18, wherein the deep learning algorithm includes a plurality of artificial neural network layers.

20. The method of claim 18, wherein the applying of the first filter or the second filter further includes:

generating a personalization algorithm using the deep learning algorithm, and determining a filter to be applied to typo correction based on the personalization algorithm.

* * * * *